United States Patent
Duan et al.

(10) Patent No.: US 10,619,008 B2
(45) Date of Patent: Apr. 14, 2020

(54) ALIPHATIC POLYIMIDES FROM UNSATURATED MONOANHYDRIDE OR UNSATURATED DIACID REACTED WITH BOTH MONOAMINE AND DIAMINE

(71) Applicant: PolyOne Corporation, Avon Lake, OH (US)

(72) Inventors: Yannan Duan, Westlake, OH (US); Roger W. Avakian, Solon, OH (US)

(73) Assignee: PolyOne Corporation, Avon Lake, OH (US)

( * ) Notice: Subject to any disclaimer, the term of this patent is extended or adjusted under 35 U.S.C. 154(b) by 609 days.

(21) Appl. No.: 15/305,817

(22) PCT Filed: Apr. 23, 2015

(86) PCT No.: PCT/US2015/027293
§ 371 (c)(1),
(2) Date: Oct. 21, 2016

(87) PCT Pub. No.: WO2015/164603
PCT Pub. Date: Oct. 29, 2015

(65) Prior Publication Data
US 2017/0044319 A1 Feb. 16, 2017

Related U.S. Application Data

(60) Provisional application No. 61/984,636, filed on Apr. 25, 2014.

(51) Int. Cl.
*C08G 73/10* (2006.01)
*C08L 79/08* (2006.01)
*C08G 73/12* (2006.01)
*C08G 73/02* (2006.01)

(52) U.S. Cl.
CPC ......... *C08G 73/10* (2013.01); *C08G 73/0273* (2013.01); *C08G 73/105* (2013.01); *C08G 73/106* (2013.01); *C08G 73/121* (2013.01); *C08G 73/124* (2013.01); *C08G 73/125* (2013.01); *C08L 79/08* (2013.01)

(58) Field of Classification Search
None
See application file for complete search history.

(56) References Cited

U.S. PATENT DOCUMENTS

| | | | | |
|---|---|---|---|---|
| 3,738,967 A * | 6/1973 | Crivello | ................ | C08G 75/02 528/321 |
| 4,179,551 A | 12/1979 | Jones et al. | | |
| 6,495,657 B1 | 12/2002 | McDonald et al. | | |
| 7,208,566 B2 | 4/2007 | Mizori et al. | | |
| 8,415,812 B2 | 4/2013 | Dershem et al. | | |
| 2003/0104232 A1* | 6/2003 | Kihara | ................... | C08G 73/10 428/473.5 |
| 2008/0262191 A1 | 10/2008 | Mizori | | |
| 2009/0121255 A1* | 5/2009 | Katayama | .............. | C08G 73/00 257/100 |
| 2011/0210407 A1* | 9/2011 | Katayama | .......... | C08G 73/1046 257/414 |
| 2012/0283378 A1 | 11/2012 | Shoshi et al. | | |
| 2017/0044319 A1 | 2/2017 | Duan et al. | | |
| 2017/0044320 A1 | 2/2017 | Duan et al. | | |
| 2017/0051111 A1 | 2/2017 | Duan et al. | | |

FOREIGN PATENT DOCUMENTS

| | | | |
|---|---|---|---|
| CN | 103074030 A | | 5/2013 |
| GB | 1298567 A | | 12/1972 |
| JP | 07110484 A | * | 4/1995 |
| JP | 2002088152 A | | 3/2002 |

OTHER PUBLICATIONS

McKeen (Film Properties of Plastics and Elastomers, Third Edition, 2012, Elsevier, Chapter 1, pp. 1-18). (Year: 2012).*
Feng, J. et al., "Synthesis and Characterization of the Bismaleimides Containing Aliphatic-ether Chain for Microelectronics Application," e-Polymers 2006, No. 044, pp. 1-11.
Hartford, S. et al., "Synthesis of N-Substituted Bisitaconimide Monomers for Use as Thermosetting Polyimide Resins," Journal of Polymer Science: Polymer Chemistry Edition, vol. 16, No. 1, Jan. 1978, pp. 137-153.
Kovacic, P. et al., "Cross-linking of Polymers with Dimaleimides," Journal of the American Chemical Society, 1959, vol. 81, No. 5, pp. 1187-1190.
Li, B. et al., "High modulus aliphatic polyimide from 1, 3-diaminopropane and ethylenediaminetetraacetic dianhydride: Water soluble to self-patterning," Polymer, 2011, vol. 52, No. 22, pp. 5186-5192.
Mather, B. et al., "Michael addition reactions in macromolecular design for emerging technologies," Progress in Polymer Science, 2006, vol. 31, pp. 487-531.
Mathews, A. et al., "Fully Aliphatic Polyimides from Adamantane-Based Diamines for Enhanced Thermal Stability, Solubility, Transparency, and Low Dielectric Constant," Journal of Applied Polymer Science, vol. 102, 3316-3326 (2006).
Mathews, A. et al., "Synthesis and Characterization of Novel Fully Aliphatic Polyimidosiloxanes Based on Alicyclic or Adamantyl Diamines," Journal of Polymer Science: Part A: Polymer Chemistry, vol. 44, 5254-5270 (2006).
Popov-Pergal, K. et al., "Thermal, oxidative and radiation stability of polyimides I. Bismaleimidoethane and different diamine-based polyimides," Polymer Degradation and Stability, 2000, vol. 67, Issue 3, pp. 547-552.

(Continued)

*Primary Examiner* — Rachel Kahn
(74) *Attorney, Agent, or Firm* — John H. Hornickel; Michael J. Sambrook

(57) ABSTRACT

Aliphatic polyimides are synthesized by a reaction of 2 moles of an unsaturated monoanhydride or an unsaturated diacid with both one mole of a diamine and one mole of a monoamine. Imidization of intermediates so formed from those reactions resolve to 6 possible bicyclic imidic structures bridged by monoamidic or saturated hydrocarbon spans, more likely the latter. Bio-derived monomers are particularly useful in the synthesis of the aliphatic polyimides.

4 Claims, No Drawings

(56) References Cited

OTHER PUBLICATIONS

Vygodskii, Y. et al., "Synthesis and Investigation of Crosslinked Polymers Based on Aliphatic Bismaleimides and Cardic Diamines," Polymer Science U.S.S.R., vol. 21, pp. 2951-2959, Pergamon Press Ltd. 1980.
White, J. et al., "Reactions of Diaminoalkanes with Bismaleimides: Synthesis of Some Unusual Polyimides," Journal of Applied Polymer Science, 1984, vol. 29, pp. 891-899.
International Preliminary Report on Patentability (Chapter I) for PCT/US2015/027285 (U.S. Pat. Appln. Pub. No. 20170044320).
International Preliminary Report on Patentability (Chapter I) for PCT/US2015/027289 (U.S. Pat. Appln. Pub. No. 20170051111).
International Preliminary Report on Patentability (Chapter I) for PCT/US2015/027293 (U.S. Pat. Appln. Pub. No. 20170044319).
Chun-Shan et al: Thermally initiated cure kinetic of bismaleimides containing poly(dimethylsiloxane), Polymer, 40, 1999, pp. 5407-5413.
Pozos Vazquez et al: UV-Curable Bismaleimides Containing Poly(dimethylsiloxane): Use as Hydrophobic Agent, Journal of Polymer Science: Part A: Polymer Chemistry, 48, 2010, 2123-2134.
Gelest: Aminopropyl Terminated Polydimethylsiloxane, 10-15 cSt, 2018, 2 pages.
Galanti, A. et al.: "The Synthesis of Biscitraconimides and Polybiscitraconimides," Journal of Polymer Science, Polymer Chemistry Edition, vol. 19, No. 2, Feb. 1981, pp. 451-475, XP055410601.
Scott et al: Biomass in the manufacture of industrial products—the use of proteins and amino acids, Appl Microbiol Biotechnol (2007), 75:751-762.

* cited by examiner

ALIPHATIC POLYIMIDES FROM UNSATURATED MONOANHYDRIDE OR UNSATURATED DIACID REACTED WITH BOTH MONOAMINE AND DIAMINE

CLAIM OF PRIORITY

This application claims priority from U.S. Provisional Patent Application Ser. No. 61/984,636 filed on Apr. 25, 2014, which is incorporated by reference.

FIELD OF THE INVENTION

This application concerns the synthesis of aliphatic polyimides, preferably from bio-based ingredients, using unsaturated monoanhydride or unsaturated diacid with both monoamine and diamine.

BACKGROUND OF THE INVENTION

In recent years there has been an increasing interest in polymers derived from non-petroleum sources. These bio-derived polymers are more sustainable since they are derived from renewable sources and can be made from domestically produced monomers. Unfortunately most bio-derived polymers have been technical constrained in durable applications by having low glass transition temperatures (Tgs) (and hence, low heat distortion temperatures for amorphous polymers), low impact strength, and limited hydrolytic stability.

A key example of a commercially available bio-derived polymer is poly lactic acid, or PLA, that is derived from the fermentation of sugar from corn, but soon to be from tapioca, sugar cane, and eventually cellulose. Sugar is fermented to lactic acid which is converted into lactide (dimer of lactic acid) chemically and further chemically polymerized to polymer. PLA is clear and 100% bio-derived but unfortunately has a low Tg of about 56° C. and is brittle. Attempts have been made to develop higher glass transition polymers via copolymerization with monomers such as furan/isosorbide that yield furan/isosorbide that yield higher Tg polymers. Unfortunately these monomers are currently either in short supply or very expensive.

SUMMARY OF THE INVENTION

What is desired is a general class of polymer that fits the at least most of the following criteria:
Tg >65° C.,
hydrolytic stability close to PET,
improved flammability over PLA, e.g. Limiting Oxygen Index >17%,
largely bio-derived content >90%, preferably 100%,
properties that can be easily tailored by monomer selection,
applicable to a reactive extrusion process,
cost effective, e.g. in both conversion process and raw materials costs.

It was decided to investigate the class of aliphatic polyimides, due to the availability of suitable monomers and properties of polyimides relative to the criteria above.

One aspect of the present invention is an aliphatic polyimide selected from the group consisting of:

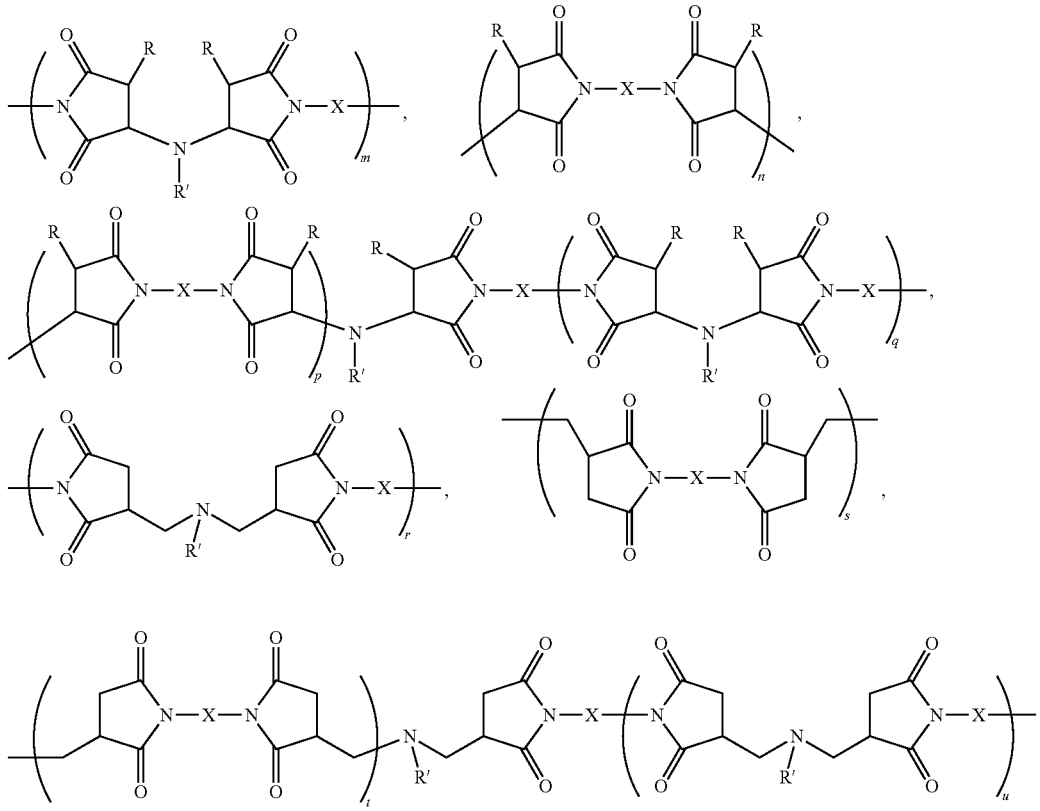

and combinations thereof, wherein m is greater than about 20, wherein n is greater than about 20, wherein p+q is greater than about 20, wherein r is greater than about 20, wherein s is greater than 20, wherein t+u is greater than about 20, wherein x is from 1 to 1000, wherein y is from 1 to 100, wherein R is H for maleic anhydride or $CH_3$ for citraconic anhydride, R' ranges from butyl to tetradecyl, and $X=(CH_2)_z$,

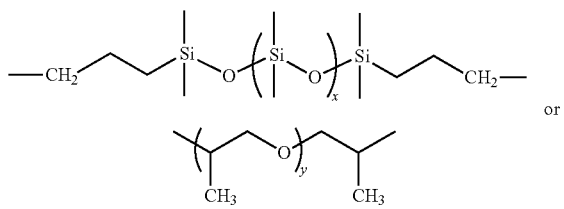

or wherein x is 1 to 1000, wherein y is 1 to 100, and wherein z is 2 to 12.

EMBODIMENTS OF THE INVENTION

Polyimides

Polyimides are an important class of polymers which have been utilized commercially in the areas of aerospace, electronics, photovoltaics, and membranes. Polyimides as a class of polymers possess several desirable properties, especially high thermal stability, very good electrical properties, low moisture uptake, low flammability characteristics, good hydrolytic stability, and flexibility in modifying properties via monomer selection and amount.

Polyimides are typically prepared commercially from a dianhydride and a diamine in a solution process, but melt processes have been described and are desired. Another route from isocyanurates and dianhydrides to polyimides has also described.

Additionally the ability of the properties of polyimides to be modified dramatically by the proper selection of monomers provides this class of polymers a unique degree of molecular design not seen with most polymers.

Polyimides can be classified into thermosetting or thermoplastic. Typically, the thermosetting type of polyimide is prepared by choosing the appropriate end-capping moiety with sequential crosslinking or curing at that point. However, polyimides with elastomeric blocks and liquid crystal blocks have also been prepared.

Polyimides can be further classified as to whether the starting monomers are all aromatic or aliphatic (cyclic, straight chain, or both) or a combination of both.

Typically for high temperature applications, the wholly aromatic polyimides are chosen, and hybrids can be used for specific applications, e.g., where the aliphatic is a diamino siloxane, an elastomeric polymer can be obtained. However aliphatic polyimides are being reinvestigated for lower temperature optical applications where the non-aromatic characteristics give the polyimide polymer less inherent color and yet retain good dielectric properties.

An area that had not been explored until this invention was an attempt to make high molecular weight polyimides from unsaturated monoanhydrides and preferably from "bio-derived monomers". For purposes of this invention, "bio-derived monomers" means monomers which are, or foreseeably can be made from, biologically active sources, such as bio-mass. Even though some of the experiments might rely upon petrochemical sources, as stated in the text following the experiments, the literature describes means of making the various monomers or their precursors from biologically active sources. Therefore, this invention is not to be limited to only those monomers presently bio-derived but also includes those monomers presently petrochemically derived but become also available from biologically active sources While this work emphasizes thermoplastic materials, a person having ordinary skills in the art would know how to modify the polyimide endgroups to render the polymer capable of thermosetting. That person would also understand how to incorporate elastomeric segments to yield an elastomeric polyimide.

In this invention, totally aliphatic class of polyimides were explored, because at present there is no readily available source of naturally occurring aromatic amines and/or anhydrides derived from bio-mass. However, several aliphatic anhydrides are available from citric acid, namely itaconic and citraconic anhydrides, obtained by the heating of citric acid which itself can be obtained from citrus waste streams or by fermentation of glucose. As well the corresponding di-acids are available. Additionally butanediol is becoming available from bio-mass, and there are chemical methods to manufacture maleic anhydride from butanediol as well as from succinic acid, which is currently being produced from bio-mass.

Unfortunately there are no dianhydrides readily available from bio-mass. So a method had to be sought that could transform aliphatic monoanhydrides into aliphatic dianhydrides. Initially it was thought from a study of U.S. Pat. No. 6,495,657 that this transformation was a straightforward task. Unfortunately, this was not the case, but new approaches were developed in order to have the desired difunctionality necessary to make high molecular weight polyimides.

On the amine side, aliphatic amines are usually found in the degradation of amino acids, but the most readily available diamines today are 1,10 diamino decane and 1,9 diamino nonane both derived from castor bean oil, a bio-based or otherwise renewable resource. There are already efforts to make 1,6 hexane diamine from bio-mass because of its use in making nylon 6,6. And recently a "green synthesis" for the production of amines from alcohols has also been published which may open the way to further diamines of shorter chain length, e.g. 1,4 diamino butane from 1,4 butanediol, 1,3 and 1,2 diaminopropanes from 1,3 propanediol and 1,2 propanediol respectively, and finally ethylene diamine from ethylene glycol. Recently, 1,5 pentamethylenediamine made from bio-mass or sugar through micro-organism process is commerically available, and it has been used to make bio-based nylons.

Before this work, the only aliphatic polyimides from biological sources that was found in the literature was described in U.S. Pat. No. 4,046,748, where an attempt was made of synthesizing a bio-polyimide polymer from a terpene. It describes the preparation of a dianhydride by reacting a terpene and maleic anhydride; unfortunately the major adduct about 85% is a monoanhydride with only about 15% of the product being a dianhydride, which is necessary for making high molecular weight polyimide. Reaction with a difunctional amine yielded a polymer with a number average molecular weight 704 g/mole. This material was not truly polymeric in nature and was only useful as a tackifying resin. No attempts were described to isolate or separate the dianhydride from the reaction mixture for further attempts at polymerization.

Therefore, aliphatic polyimides preferably from bio-derived monomers, as defined above, were explored and found to be capable of polymerization, according to this invention.

Experiments and Results

Experimental Methods

All materials were purchased from Sigma-Aldrich or other suppliers and used as received.

In order to quickly determine whether double bonds were present, the Baeyer test with aqueous permanganate ion was utilized. The purple aqueous permanganate ion color changes to a brownish precipitate if oxidization of C═C double bonds occurs. Appropriate FT-IR was used to determine the presence of functional groups, e.g. presence of imide group. Because the polymeric materials obtained were largely insoluble, CHN elemental analysis was used to determine structures by best fit to theoretical structures. Thermal analyses were utilized to determine Tg, and weight loss. Determination of thermoplastic nature was determined by the characterizing the reversible deformability of polymeric films on a hot heating plate. Color was noted visually.

Hydrolytic stability was determined by subjecting samples to hydrolysis conditions at 80° C. in water-filled vials in a heated oven. Hydrolysis stability at 100° C. was conducted by refluxing the appropriate samples in deionized water. Conductance measurements were carried out at appropriate time intervals. Equal mass amounts of the films were used; for the refluxing water experiments, 0.4 gram sample to 30 grams water were used. For the 80° C. hydrolysis work, the sample size was 0.8 gram to 50 grams water. For the refluxed samples, additional water was added to make sure that the weight of water was the same.

Flammability testing was conducted by subjecting a film of the bio-polyimide to an open flame from a butane lighter.

Instrumental Information:

Fourier transform infrared spectroscopy (FTIR) was used to identify the presence of functional groups. The spectra for polyimide films were collected by transmission mold using Nicolet 710, pressed in the diamond anvil optical cell. The spectra for intermediates were collected by transmission mode with the same instrument using liquid film technique on Germanium.

Differential scanning calorimetry (DSC) was utilized to determine glass transition temperature and thermal stability. The samples were analyzed using a TA Instruments model DSC Q2000. The specimens were exposed to a heat-cool-heat cycle in the analysis. The temperature range of each segment was from 60° C. to 120° C. (or 180° C. or 240° C.) at heating/cooling rates of 10° C./minute. A helium gas purge of 25 ml/minute was used. The glass transition temperature (Tg) of the sample was determined using the half-height from the data recorded in the second heating segment of the analysis.

Thermogravimetric analysis (TGA) was utilized to determine the thermal stability of bio-derived polyimide films. The samples were analyzed using a TA Instruments model TGA Q2000. The temperature range was from room temperature to 700° C. at a heating rate of 10° C./minute in air with a flow rate of 70 mL/min.

The viscoelastic properties were analyzed by a TA Instruments ARES G2 mechanical spectrometer, equipped with a rectangular solids shear fixture, to determine the temperature-dependent shear viscoelastic properties at an oscillatory frequency of 1 radian/s. Dynamic strain amplitude was controlled between 0.05 and 5%, depending upon the magnitude of modulus. The temperature range examined started at 20° C. and terminated when the complex modulus fell below 104 Pa.

Gel permeation chromatography (GPC) was utilized to obtain information on number-average molecular weight, weight-average molecular weight and molecular weight distribution using Waters Corporation modular HPLC/GPC system including Model 2414 Refractive Index Detector (RI), Model 515 HPLC Pump and Model 717plus Autosampler. The samples were processed on Justice Systems Chrom Perfect software. The solvent used was tetrahydrofuran (THF) or dimethylformamide (DMF). Standard polystyrenes were used for calibration in THF and standard polymethylmethacrylates were used in DMF.

Gas chromatographymass spectrometry (GC-MS) was utilized to analyze the structure of intermediate using HP 6890 series GC system and HP 5943 mass-selective detector. The temperature used for this test was 250° C.

CHN elemental analysis was done at Robertson Microlit Laboratories Inc. in NJ. Silicon content was done in the same lab using microwave digestion method.

Conductance for the hydrolytic stability experiments were carried out using an Extech Instruments ExStik® II pH/Conductivity/TDS Meter, Model EC500. Measurements were carried out between 22°-25° C.

Dielectric constant and dissipation factor were measured by HP 4194A Impedance/Gain-Phase Analyzer following the ASTM D150 at room temperature. The sample size was in a dimension of 4 inch×4 inch (10.2 cm×10.2 cm) with a thickness around 1.5 mm The weathering properties of aliphatic polyimides were studied by dry QUV accelerated weathering test following ASTM D4329. Samples are mounted in the QUV apparatus and subjected to a continuous exposure at 40° C. to intense ultraviolet radiation without moisture exposure or condensation. The testing was done using Q-Panel QUV/se with Solar Eye irradiance controller with UVA-351 lamp. The total testing time is 1000 hours. Samples were taken out for color reading and FT-IR analysis at the beginning of test and every 250 hours.

Bio-content test was done in Beta Analytic Inc in Miami, Fla. This gave the quantification of renewable carbon content by ASTM-D6866.

Summary of Examples

There are two methods employed. The first method (Examples 1-5, Examples 6-20, and Examples 21-22) used unsaturated monoanhydride, and the second method (Examples 23-24) used unsaturated diacid. Both methods employ sequential additions of monoamines and diamines to the unsaturated monoanhydrides or unsaturated diacids, respectively, in the reaction schemes.

First Method

There are two embodiments of the first method of the present invention using unsaturated monoanhydride.

In the first embodiment, in a first sequence, (Examples 1-5), one uses 1 mole of monoamine to 2 moles of monoanhydride having an unsaturated heterocyclic ring (e.g., maleic anhydride and citraconic anhydride) to form a first amic acid. Then one adds 1 mole a diamine to react with the second mole of monohydride not yet reacted to form a second amic acid. Upon the application of heat, the two amic acids condense to form a bis-imide with loss of the monoamine and water, at thermal imidization reaction. The bis-imide can take any of three reaction pathways: a single bis-imide reacting with monoamine to form a polyimide of Structure I after Michael Addition; a bis-imide self-polymerizing to form a polyimide of Structure II with the release of monamine; and a random copolymer having a random mixture of those two Structures I and II.

In the first embodiment, second sequence (Examples 6-20) one uses 1 mole of diamine and 2 moles of anhydride having unsaturated heterocyclic rings to form a di(amic acid) first, and then one adds 1 mole monoamine to form an amic acid salt, followed by heat to imidize the salt into one of three different polyimides. The final product can contain three types of polymer, surprisingly the same as in the first embodiment, first sequence (Examples 1-5): (1) a homo-linear polymer of monomeric structure I after Michael Addition, (2). a homo-linear polymer with monomeric structure II, or (3) a random copolymer having a random mixture of those two monomeric structures I and II.

In the second embodiment of the first method, (Examples 21-22), one uses 1 mole of diamine to 2 moles of monoanhydride having an external unsaturated alkyl group (e.g., itaconic anhydride) to form a di(amic acid). Then one adds 1 mole of a monoamine to form a diamic acid salt, which upon application of heat, forms three different polyimides by thermal imidization. The final product can contain three types of polymer: (1) a homo-linear polymer of one monomeric structure III after Michael Addition, (2) a homo-linear polymer with a second monomeric structure IV, or (3) a random copolymer having a random mixture of those two monomeric structures III and IV.

Even though the second embodiment uses the same sequence of diamine addition, followed by monamine addition, starting with itaconic anhydride instead of maleic anhydride or citraconic anhydride was found to result in at least some polyimides which have a longer bridge between adjacent cyclic imide groups, a comparison of monomeric structure III vs. monomeric structure I as seen below in Reaction Schemes for Examples 21-22 and Examples 6-20, respectively.

Second Method

There are two embodiments of a second method of the present invention using unsaturated diacid.

In the first embodiment of the second method, Example 23, one uses 1 mole of diamine to 2 moles of diacid to form a di(amic acid). Then one adds 1 mole of a monoamine to form a diamic acid salt, which upon application of heat, forms three different polyimides by thermal imidization. Example 23 conforms to the results of the second embodiment of the first method (Examples 21-22) in that the final product can contain three types of polymer: (1) a homo-linear polymer of one monomeric structure III, (2). a homo-linear polymer with a second monomeric structure IV, or (3) a random copolymer having a random mixture of those two monomeric structures III and IV.

In a second embodiment of the second method, (Example 24) one uses a 1 mole of diamine and 2 moles of diacid to form a di(amic acid) first, and then adds 1 mole monoamine to a diamic acid salt, followed by heat to imidize the salt. Example 24 conforms to the results of the first embodiment of the first method (Examples 1-5 and 6-20) in that the final product can contain three types of polymer: (1) a homo-linear polymer of monomeric structure I after Michel Addition, (2). a homo-linear polymer with monomeric structure II, or (3) a random copolymer having a random mixture of those two monomeric structures I and II.

Preparation of Examples 1-24

Table A shows the ingredients used in all Examples of this document, except the sodium phenyl phosphinate which was synthesized as follows:

14.21 grams of phenylphosphinic acid (0.10 mole) was dissolved in 50 mL of methanol at room temperature in a 250 mL single-neck round bottom flask along with a magnetic stirring bar. Then 4.00 grams of sodium hydroxide (0.10 mole) was added and dissolved. The reaction was observed to be exothermic. The solution was kept stirring at room temperature for one hour. The pH value of the final solution was tested by a piece of pH test paper. The pH value was 7.

Most of the solvent was evaporated by keeping the flask in the hood for three days. Then a white solid precipitated out from the solution. The white solid was vacuum dried at 60° C. overnight to remove any residual solvent or moisture. The final material was a white solid of 11.87 grams.

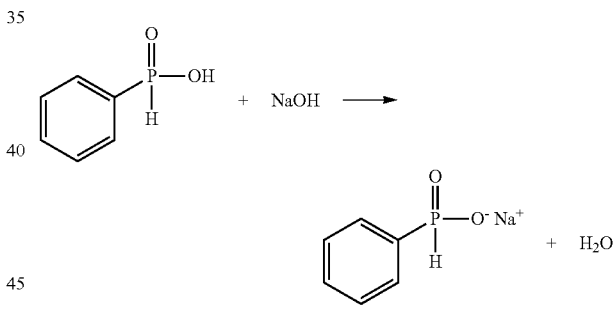

TABLE A

| Chemical Name | Form | CAS Number | Vendor | Structure |
|---|---|---|---|---|
| citraconic anhydride | liquid | 616-02-4 | Sigma Aldrich | (structure with CH₃) |
| maleic anhydride | white solid | 108-31-6 | Sigma Aldrich | (structure) |
| itaconic anhydride | white solid | 2170-03-8 | Sigma Aldrich | (structure with CH₂) |

TABLE A-continued

| Chemical Name | Form | CAS Number | Vendor | Structure |
| --- | --- | --- | --- | --- |
| citraconic acid | white solid | 498-23-7 | Sigma Aldrich | (structure: 2-methylmaleic acid) |
| itaconic acid | white solid | 97-65-4 | Sigma Aldrich | (structure: itaconic acid) |
| n-butyl amine | liquid | 109-73-9 | Sigma Aldrich | (structure: $CH_3CH_2CH_2CH_2NH_2$) |
| tetradecylamine | solid | 2016-42-4 | Sigma Aldrich | $CH_3(CH_2)_{12}CH_2-NH_2$ |
| 4,4' diaminodiphenyl sulfone | White powder | 80-08-0 | Sigma Aldrich | $H_2N$-C$_6H_4$-SO$_2$-C$_6H_4$-$NH_2$ |
| 1,10 diaminodecane | white solid | 646-25-3 | Sigma Aldrich | $NH_2CH_2(CH_2)_8CH_2NH_2$ |
| hexamethylenediamine | waxy solid | 124-09-4 | Sigma Aldrich | $H_2NCH_2(CH_2)_4CH_2NH_2$ |
| 1,4 diaminobutane | waxy solid | 110-60-1 | Sigma Aldrich | $H_2N-(CH_2)_4-NH_2$ |
| ethylene diamine | liquid | 107-15-3 | Sigma Aldrich | $H_2N-CH_2CH_2-NH_2$ |
| 1,12 diaminododecane | white solid | 2783-17-7 | Sigma Aldrich | $H_2NCH_2(CH_2)_{10}CH_2NH_2$ |
| Jeffamine ® D-230 | viscous liquid | 9046-10-0 | Huntsman | $H_2N-[CH(CH_3)CH_2O]_x-CH(CH_3)-NH_2$; x = 2.5 |
| polydimethylsiloxane, DMS-A11 | viscous liquid | 106214-84-0 | Gelest, Inc. | $H_2N(CH_2)_3Si(CH_3)_2-O-[Si(CH_3)_2-O]_n-Si(CH_3)_2(CH_2)_3NH_2$ |
| Irganox ® MD 1024 Chemical name: 2',3-bis[[3-[3,5-di-tert-butyl-4-hydroxyphenyl]propionyl]]propionohydrazide | white solid | 32687-78-8 | Ciba Inc., now part of BASF | $[HO-C_6H_2(t-Bu)_2-(CH_2)_2-C(O)-NH-]_2$ |

TABLE A-continued

| Chemical Name | Form | CAS Number | Vendor | Structure |
|---|---|---|---|---|
| Irgafos ® P-EPQ chemical name: [4-[4-bis(2,4-ditert-butylphenoxy) phosphanylphenyl] phenyl]-bis(2,4-ditert-butylphenoxy)phosphane | white solid | 119345-01-6 | Ciba Inc., now part of BASF | |
| Irganox ® 1010 Chemical name: pentaerythritol tetrakis(3-(3,5-di-tert-butyl-4-hydroxyphenyl) propionate) | white solid | 6683-19-8 | Ciba Inc., now part of BASF | |
| methanol | liquid | 67-56-1 | Sigma Aldrich | $CH_3OH$ |
| isopropanol | liquid | 67-63-0 | Sigma Aldrich | |
| tetrahydrofuran | liquid | 77392-70-2 | Sigma Aldrich | |
| sodium phenyl phosphinate | white solid | 4297-95-4 | Synthesized as reported above. | |

Examples 1-5: First Method, First Embodiment, First Sequence
Below is the reaction scheme for Examples 1-5.
Reaction Scheme for Examples 1-5
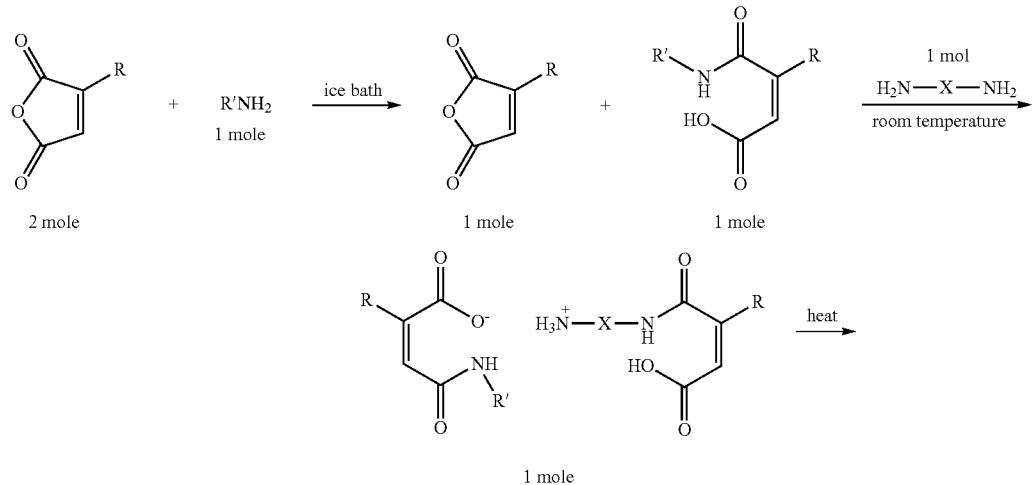
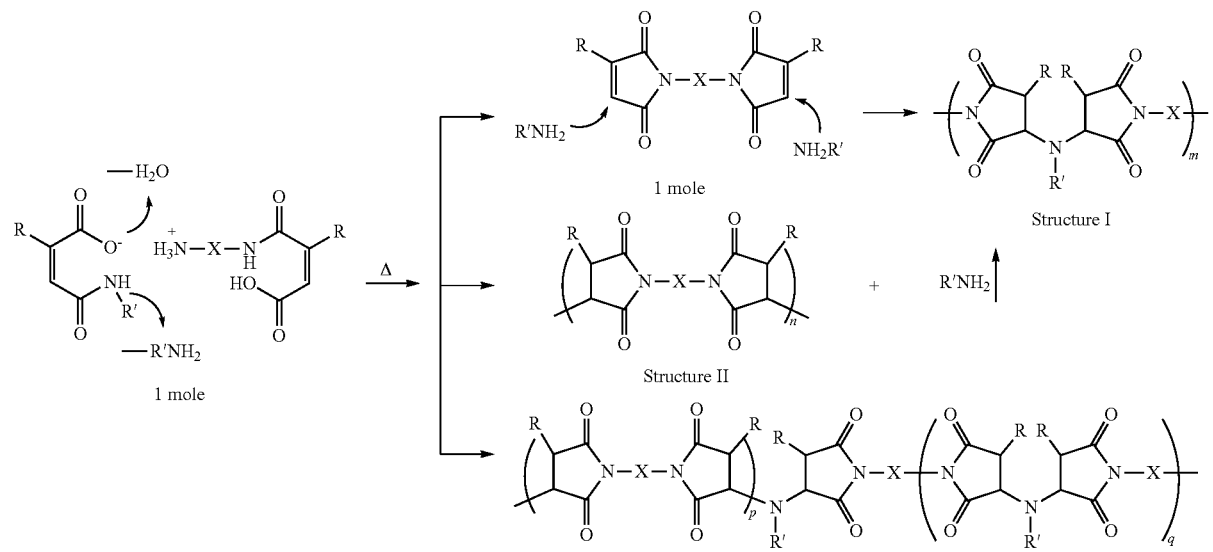
R = H, CH₃ for maleic, citraconic anhydride, respectively
R' = (CH₂)₃CH₃, (CH₂)₁₃CH₃
X = (CH₂)₁₂, (CH₂)₁₀, (CH₂)₉, (CH₂)₆, (CH₂)₄, (CH₂)₂,
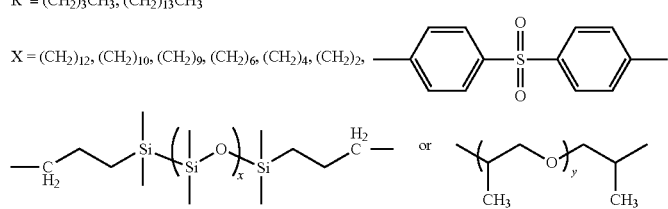

wherein m is greater than about 20 and preferably greater than about 150, wherein n is greater than about 20 and preferably greater than about 150, wherein p+q are greater than about 20 and preferably greater than about 150, wherein x can be 1 to 1000, desirably about 5 to about 25, and preferably about 8 to about 14, and wherein y can be 1 to 100, desirably about 2 to about 35, and preferably about 2 to about 8 and X can be $(CH_2)$ where z is between 2 and 12, including the odd integers besides those shown in the Reaction Scheme above.

It is to be noted that for Comparative Example 2, an aromatic sulfone was used as X and is not included in the recitation of the claimed polyimides in Reaction Scheme for Examples 1-5.

Example 1: Mixture of poly-4-N-butylamino-yl-4'-yl-((1,1'-decane-1,10-diyl)-bis-(3-methyl-pyrrolidine-2,5-dione)), poly-4,4'-yl-((1,1'-decane-1,10-diyl)-bis-(3-methyl-pyrrolidine-2,5-dione)) and poly-[4-N-butylamino-yl-4'-yl-((1,1'-decane-1,10-diyl)-bis-(3-methyl-pyrrolidine-2,5-dione))]-co-[4,4'-yl-((1,1'-decane-1,10-diyl)-bis-(3-methyl-pyrrolidine-2,5-dione))]

An intermediate was prepared as follows. First, 2.2416 g of commercially available citraconic anhydride (0.02 mole) was dissolved in 10 g methanol in a single-neck flask along with a magnetic stirring bar. The flask was cooled down in an ice bath with magnetic agitation. Then, 0.7314 g of commercially available n-butylamine (0.01 mole) was dissolved in 5 g of methanol and added slowly into the cooled citraconic anhydride solution with stirring. The solution was clear and the addition of n-butylamine required about two hours, and the ice bath conditions were maintained for another one hour after the addition to ensure the complete reaction. Note that this reaction was observed to be exothermic, so were the other reactions between anhydrides and aliphatic amines at this temperature. The intermediate was kept in solution and used as it is for the next step. A small amount of intermediate was isolated for analysis by evaporation of methanol in the hood, and then complete removal of methanol was accomplished in a vacuum oven at 50° C. overnight. The intermediate surprisingly exhibited fluorescence under ultraviolet light with a wavelength of 365 nm. The intermediate was analyzed via Fourier transform infrared spectroscopy (FT-IR) and Gas Chromatography-Mass Spectrometry (GC-MS). The infrared spectrum showed bands consistent with an acid functionality, free hydroxyl and secondary amide. Additional information from GC-MS showed evidence for half methyl esters from citraconic anhydride and a half amide half acid ring-opened adduct of the citraconic anhydride. The Baeyer test was performed to test the presence of C═C bonds of the intermediate I after the addition of n-butylamine. It was carried out by adding 2% aqueous potassium permanganate solution drop by drop to the intermediate I/methanol solution (0.05 g/5 mL) with shaking until the purple color of the permanganate persists. A positive test means the disappearance of the purple color and the appearance of a brown suspension. The Baeyer test of this intermediate showed a positive result which indicated the presence of C═C.

The ring opened intermediate I solution was used to react with a diamine. First, the intermediate I/methanol solution which contained 2.9730 grams of the intermediate I (0.01 mole) prepared as above was cooled down in ice bath with magnetic stirring. Second, 1.7231 grams of commercially available 1,10-diaminodecane (0.01 mole) was dissolved in 15 grams of methanol and then added drop wise into the intermediate reaction product/methanol solution in an ice bath over a one hour period. The flask was removed from the ice bath with continuous stirring for another two hours. The product was kept in solution for the next imidization step. A small amount intermediate II was isolated for analysis by evaporation of methanol in the hood, and then complete removal of methanol was accomplished in a vacuum oven at 50° C. overnight. The Baeyer test of this intermediate II also showed a positive result, which suggested the C═C bonds still presented at this stage.

The intermediate II solution was used as it is without further processing to prepare polyimide film via thermal imidization. First, methanol in the solution was removed by evaporation at room temperature. Then, the viscous light yellow liquid was kept at 60° C. for 2 hours, and temperature was ramped to 220° C. at a rate of 3° C./min. The imidization kinetics and color change were studied by taking samples at different temperature during the imidization. Finally, an amber-colored, flexible film was formed and this film was analyzed by FT-IR, Thermogravimetric Analysis (TGA) and Differential Scanning calorimetry (DSC). This final amber-colored film was very flexible. TGA showed a high decomposition temperature starting at 340° C. and 10% weight loss at 430° C. in air at a heating rate of 10° C./min. DSC showed a Tg at 87° C. in nitrogen at a heating rate of 10° C./min. The aging properties at 200° C. indicated less than 3% weight loss after 25 hours. In the IR spectrum, the location of the bands was consistent with the presence of an imide. The broadness of the bands suggested the incidence of a polymer. Although it cannot be dissolved in most of the common solvents, its thermoplastics behavior was demonstrated by a video while being heated on a hot plate around 200° C. It can be softened, be bent and twisted during heating. The deformation is maintained if the film is cooled to room temperature, and its original shape can be recovered during a second heating. Furthermore, the weight loss of the film was monitored over time by keeping the film in air at 200° C. for 27 hours. Weight loss was less than 3%. Baeyer test of samples taken at different temperatures were performed. The soluble part of samples taken at a temperature of lower than 210° C. showed positive results. Samples taken at 210° C. gave a negative result, indicating C═C bonds almost disappeared at this stage.

The intermediate II solution prepared in the second step was used to prepare polyimide bar via thermal imidization for Dynamic Mechanical Analysis (DMA). First, solvent in the solution was removed by evaporation at room temperature. Then, the viscous light yellow liquid was kept at 60° C. for 2 hours, and temperature was ramped to 220° C. at a rate of 3° C./min. Finally, an amber-colored disk was formed in a thickness of 2 mm and this disk was not flexible as the previous film sample due to the increased thickness. The disk was compressed under a pressure around 50 psi at 220° C. Then it was cooled down to room temperature while the pressure was maintained to get a completely flat surface for DMA test. The result showed initial rapid decrease in moduli and peaks in the loss tangent, which indicates a broad Tg from 35 to 60° C. The relatively constant moduli above 120° C. indicate the presence of a cross-linked network/structure having a long relaxation time. Based on the demonstration of thermoplastics behavior of polyimide films and the post-thermal treatment of imidized disk, this crosslinking phenomenon probably resulted from thermal oxidation during compression molding after imidization.

Example 2—A Comparative Example of Aromatic-Aliphatic Polyimide

Another intermediate was prepared as follows. First, 1.9612 g of commercially available maleic anhydride (0.02 mole) was dissolved in 30 g isopropanol alcohol in a single-neck flask along with a magnetic stirring bar. The flask was cooled down in an ice bath to about 0° C. with magnetic agitation. Then, 0.7314 g of commercially available n-butylamine (0.01 mole) was dissolved in 5 g of isopropanol alcohol and added slowly into the cooled citraconic anhydride solution with stirring. The solution was clear and the addition of n-butylamine required about two hours, and the ice bath conditions were maintained for another one hour after the addition to ensure the complete reaction. This intermediate I was kept in solution and used as it is for the next step. A small amount of intermediate reaction product was isolated by evaporation of solvent in the hood, and then vacuum dried at 50° C. overnight. Baeyer test of this intermediate shown a positive result, indicating the presence of C=C double bonds. The intermediate I prepared above was used to react with 4,4'-diaminodiphenyl sulfone. First, the intermediate I/isopropanol solution, which contained 2.6926 grams of the intermediate I (0.01 mole) was cooled down in an ice bath with magnetic stirring. Second, 2.4830 grams of commercially available 4,4'-diaminodiphenyl sulfone (0.01 mole) was dissolved in 25 grams of isopropanol and then added drop wise into the intermediate solution in an ice bath over a one hour period. The flask was removed from the ice bath, and continuously stirred for another two hours. The obtained solution (intermediate II) was light yellow clear solution used as it is for further imidization. Baeyer test of the intermediate at this stage gave a positive result, indicating C=C double bonds still existed.

The intermediate II/isopropanol solution prepared in the second step was used to prepare polyimide film via thermal imidization. First, solvent in the solution was removed by evaporation at room temperature. Then, the viscous light yellow liquid was kept at 60° C. for 2 hours, and temperature was ramped to 220° C. at a rate of 3° C./min as before. Finally, an amber-colored solid was formed and it was analyzed by GPC in DMF. The material was a brittle solid instead of forming a flexible film. The imidization kinetics was studied by taking samples at different temperatures during imidization. This final product has a molecular weight of 447.6 k compared to polystyrene standards. The solid was analyzed via FT-IR by being pressed in a diamond cell. The spectrum was consistent with the presence of an imide as well as a low amount of an anhydride component. Baeyer test were performed for all the samples taken at different temperatures during imidization process. The result suggested C=C doubles started to disappear at 210° C., noticing a negative result at 210° C. and positive results at temperature lower than that. DSC result showed a Tg transition of 117° C.

Example 3: Mixture of poly-4-N-butylamino-yl-4'-yl-((1,1'-decane-1,10-diyl)-bis-(3-methyl-pyrrolidine-2,5-dione)), poly-4,4'-yl-((1,1'-decane-1,10-diyl)-bis-(3-methyl-pyrrolidine-2,5-dione)) and poly-[4-N-butylamino-yl-4'-yl-((1,1'-decane-1,10-diyl)-bis-(3-methyl-pyrrolidine-2,5-dione))]-co-[4,4'-yl-((1,1'-decane-1,10-diyl)-bis-(3-methyl-pyrrolidine-2,5-dione))]

An intermediate was prepared as follows. First, 1.9612 g of commercially available maleic anhydride (0.02 mole) was dissolved in 30 g methanol in a single-neck flask along with a magnetic stirring bar. The flask was cooled down in an ice bath to 0° C. with magnetic agitation. Then, 0.7314 g of commercially available n-butylamine (0.01 mole) was dissolved in 5 g of methanol and added slowly into the cooled citraconic anhydride solution with stirring. The solution was clear and the addition of n-butylamine required about two hours, and the ice bath condition was maintained for another one hour after the addition to ensure the complete reaction. The intermediate was kept in solution and used for the next step. A small amount of intermediate reaction product was isolated by evaporation of solvent in the hood, and then vacuum dried at 50° C. overnight. GC-MS showed that the two largest components detected were unreacted maleic anhydride and the monomethyl ester (ring opened). Baeyer unsaturation test showed a positive result for this intermediate. The ring opened intermediate I prepared above was used to react with a diamine. First, the intermediate I/methanol solution which contained 2.6926 grams of the intermediate I (0.01 mole) was used in methanol solution in an ice bath. Second, 1.7231 grams of commercially available 1,10-diaminodecane (0.01 mole) was dissolved in 15 grams of methanol and then added drop wise into the intermediate reaction product/methanol solution in ice bath over a one hour period. After the addition of 1,10-diaminodecane/methanol solution, the flask was removed from the ice bath with continuous stirring for another two hours. The product was kept in solution for the next imidization step. A small amount of the poly (amic acid) product was isolated for analysis by evaporation of methanol in the hood, and then by complete removal of methanol in vacuum oven at 50° C. overnight. The Baeyer test result confirmed the presence of C=C double bonds in this intermediate.

The intermediate II solution was used as it is without further processing to prepare polyimide film via thermal imidization. First, methanol in the solution was removed by evaporation at room temperature. Then, the viscous light yellow liquid was kept at 60° C. for 2 hours, and temperature was ramped to 220° C. at a rate of 3° C./min. Finally, an amber-colored, brittle solid was formed and this solid was analyzed by FT-IR and Differential Scanning Calorimetry (DSC). DSC showed a Tg of ° C. In the IR spectrum, the location of the bands was consistent with the presence of an imide. The broadness of the bands suggested the incidence of a polymer. Its thermoplastics behavior was demonstrated while being heated on a hot plate around 200° C. It can be softened, be bent and twisted during heating. The deformation is maintained if the film is cooled to room temperature, and its original shape can be recovered during a second heating. Baeyer test of samples taken at different temperatures were performed. The soluble part of samples taken at a temperature of lower than 210° C. showed positive results. Samples taken at 210° C. gave a negative result, indicating C=C bonds almost disappeared at this stage. The Tg of final product is 109° C.

Example 4: Mixture of poly-4-N-butylamino-yl-4'-yl-((1,1'-decane-1,10-diyl)-bis-(3-methyl-pyrrolidine-2,5-dione)), poly-4,4'-yl-((1,1'-decane-1,10-diyl)-bis-(3-methyl-pyrrolidine-2,5-dione)) and poly-[4-N-butylamino-yl-4'-yl-((1,1'-decane-1,10-diyl)-bis-(3-methyl-pyrrolidine-2,5-dione))]-co-[4,4'-yl-((1,1'-decane-1,10-diyl)-bis-(3-methyl-pyrrolidine-2,5-dione))]

An intermediate was prepared as follows. First, 2.2416 g of commercially available citraconic anhydride (0.02 mole)

was dissolved in 10 g isopropanol in a single-neck flask along with a magnetic stirring bar. The flask was cooled down in an ice bath with magnetic agitation. Then, 0.7314 g of commercially available n-butylamine (0.01 mole) was dissolved in 5 g of isopropanol and added slowly into the cooled citraconic anhydride solution with stirring. The solution was clear and the addition of n-butylamine required about two hours, and the ice bath condition was maintained for another one hour after the addition to ensure the complete reaction. The intermediate was kept in solution and used for the next step. A small amount of intermediate reaction product was isolated for GC-MS analysis by evaporation of solvent in the hood, and then vacuum dried at 50° C. overnight. GC-MS detected unreacted citraconic anhydride and a half acid-half amide product. Baeyer test result was positive, which confirmed the existence of C=C double bonds at this stage. The intermediate reaction product prepared above was used to form a poly (amic acid) with the presence of 1,10-diaminodecane. First, the intermediate I/isopropanol solution which contained 2.9730 grams of the intermediate (0.01 mole) was cooled in an ice bath. Secondly, 1.7231 grams of commercially available 1,10-diaminodecane (0.01 mole) was dissolved in 15 grams of isopropanol and then added drop wise into the intermediate reaction product solution cooled in an ice bath over a one hour period. After the addition of 1,10-diaminodecane solution, the flask was removed from the ice bath and continuously stirred for another two hours. The final solution was light yellow clear solution used for further imidization. This intermediate II solution also gave a positive result for Baeyer test, indicating C=C bonds were still present at this stage.

The intermediate II/isopropanol solution in the second step was used to prepare polyimide film via thermal imidization. First, solvent in the solution was removed by evaporation at room temperature. Then, the viscous light yellow liquid was kept at 60° C. for 2 hours, and temperature was ramped to 220° C. at a rate of 3° C./min. Finally, an amber colored flexible film was formed and this film was analyzed by FT-IR, Thermogravimetrie Analysis (TGA) and Differential Scanning calorimetry (DSC). This final film was an amber-colored, flexible film. IR spectrum was very similar to that of Example 1. The location of the bands was consistent with the presence of an imide. The broadness of the bands suggested the incidence of a polymer. TGA showed a 5% weight loss at 339° C. and a 10% weight loss at 440° C. in air. DSC result showed a Tg transition of 54° C.

Example 5: Mixture of poly-4-N-butylamino-yl-4'-yl-((1,1'-nonane-1,9-diyl)-bis-(3-methyl-pyrrolidine-2,5-dione)), poly-4,4'-yl-((1,1'-nonane-1,9-diyl)-bis-(3-methyl-pyrrolidine-2,5-dione)) and poly-[4-N-butylamino-yl-4'-yl-((1,1'-nonane-1,9-diyl)-bis-(3-methyl-pyrrolidine-2,5-dione))]-co-[4,4'-yl-((1,1'-nonane-1,9-diyl)-bis-(3-methyl-pyrrolidine-2,5-dione))]

An intermediate was prepared as follows. First, 1.1210 g of commercially available citraconic anhydride (0.01 mole) was dissolved in 10 g methanol in a single-neck flask along with a magnetic stirring bar. Then, 0.3659 g of commercially available n-butylamine (0.005 mole) was dissolved in 5 g of methanol and added slowly into the citraconic anhydride solution with stirring. The solution was clear and the addition of n-butylamine required about two hours. Note that this reaction was observed to be exothermic. The intermediate was kept in solution and used as it is for the next step. The Baeyer test of this intermediate showed a positive result which indicated the presence of C=C. The intermediate solution was used to react with a diamine. First, the intermediate methanol solution which contained 1.4869 grams of the intermediate (0.05 mole) prepared as above was mixed with magnetic stirring. Second, 0.7916 grams of commercially available 1,9-diaminononane (0.005 mole) was dissolved in 20 grams of methanol and then added drop wise into the intermediate reaction product/methanol solution over a one hour period. The flask was continuously stirred for another two hours. The product was kept in solution for the next imidization step. The product solution was used as is without further processing to prepare polyimide film via thermal imidization. First, methanol in the solution was removed by evaporation at room temperature. Then, the viscous, light yellow liquid was kept at 60° C. under vacuum for 2 hours, and then the temperature was ramped to 220° C. at a rate of 3° C./min. Finally, an amber-colored, flexible film was formed. DSC showed a Tg at 83° C.

Examples 6-20: First Method, First Embodiment, Second Sequence

Below is the reaction scheme used for Examples 6-20.

Reaction Scheme of Examples 6-20

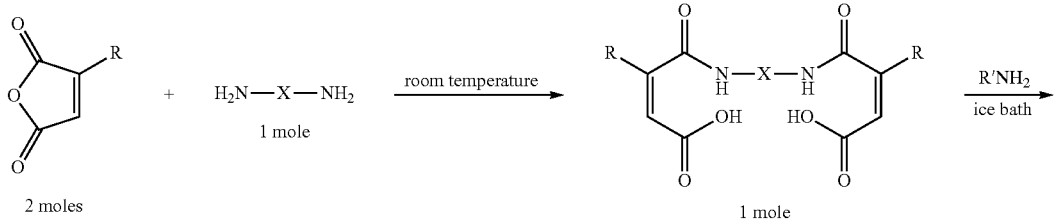

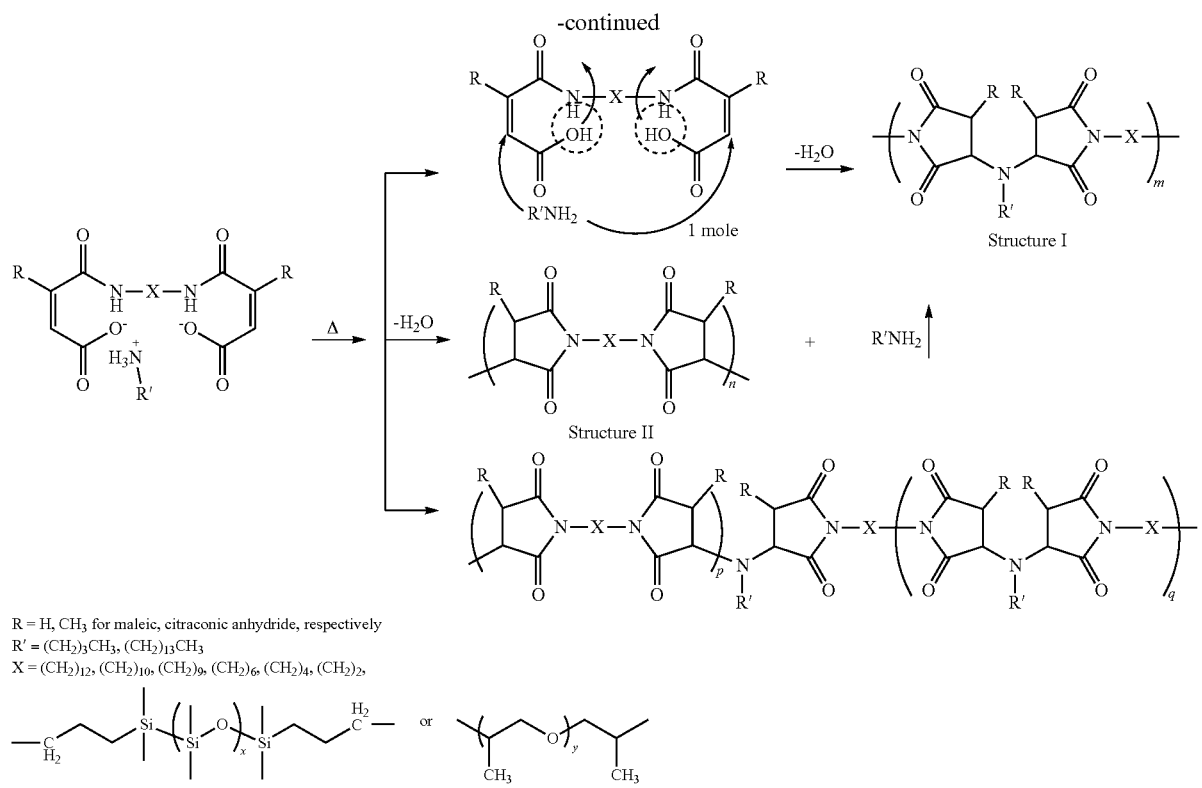

R = H, CH₃ for maleic, citraconic anhydride, respectively
R' = (CH₂)₃CH₃, (CH₂)₁₃CH₃
X = (CH₂)₁₂, (CH₂)₁₀, (CH₂)₉, (CH₂)₆, (CH₂)₄, (CH₂)₂, wherein m is greater than about 20 and preferably greater than about 150, wherein n is greater than about 20 and preferably greater than about 150, wherein p+q are greater than about 20 and preferably greater than about 150, wherein x can be 1 to 1000, desirably about 5 to about 25, and preferably about 8 to about 14, and wherein y can be 1 to 100, desirably about 2 to about 35, and preferably about 2 to about 8.

Example 6: Mixture of poly-4-N-butylamino-yl-4'-yl-((1,1'-decane-1,10-diyl)-bis-(3-methyl-pyrrolidine-2,5-dione)), poly-4,4'-yl-((1,1'-decane-1,10-diyl)-bis-(3-methyl-pyrrolidine-2,5-dione)) and poly-[4-N-butylamino-yl-4'-yl-((1,1'-decane-1,10-diyl)-bis-(3-methyl-pyrrolidine-2,5-dione))]-co-[4,4'-yl-((1,1'-decane-1,10-diyl)-bis-(3-methyl-pyrrolidine-2,5-dione))]

An intermediate of di (amic acid) was prepared via reaction between mono-anhydride and diamine. First, 2.2416 g of commercially available citraconic anhydride (0.02 mole) was dissolved in 10 g methanol in a single-neck flask along with a magnetic stirring bar. Then, 1.7231 grams of commercially available 1,10-diaminodecane (0.01 mole) was dissolved in 15 grams of methanol and then added dropwise into the solution over a one hour period at room temperature. The flask was kept stirring continuously for another two hours. A white precipitate appeared in 5 minutes. The intermediate was kept in solution and used for the next step. A small amount of intermediate reaction product was isolated by evaporation of methanol in the hood, and then methanol was completely removed in a vacuum oven at 50° C. overnight. Baeyer test result was positive, which confirmed the existence of C=C double bonds at this stage.

An intermediate prepared above was used to react with a monoamine as follows. First, with the addition of 25 g methanol, the di (amic acid) methanol suspension dissolved and formed a solution, which contained 3.9647 g intermediate (0.01 mole). The solution was cooled down in an ice bath in a single-neck flask along with a magnetic stirring bar. Then, 0.7314 g of commercially available n-butylamine (0.01 mole) was dissolved in 5 g of methanol and added slowly into the cooled solution with stirring. The solution was clear and the addition of n-butylamine required about two hours, and the ice bath condition was maintained for another one hour after the addition to ensure the complete reaction. Baeyer test result was positive, which confirmed the existence of C=C double bonds at this stage.

The intermediate obtained via the second step was used to prepare polyimide film via thermal imidization. First, methanol in the poly (amic acid)/methanol solution was removed by evaporation at room temperature. Then, the viscous light yellow liquid was kept at 60° C. for 2 hours, and temperature was ramped to 220° C. at a rate of 3° C./min. Finally, an amber colored flexible film was formed and this film was analyzed by FT-IR, Thermogravimetric Analysis (TGA) and Differential Scanning Calorimetry (DSC). FT-IR spectrum was very similar to that of example 1. The location of the bands was consistent with the presence of an imide. The broadness of the bands suggested the incidence of a polymer. The Tg was 58° C. TGA showed a 5% weight loss at 330° C. and a 10% weight loss at 407° C.

Example 7: Mixture of poly-4-N-butylamino-yl-4'-yl-((1,1'-decane-1,10-diyl)-bis-(3-methyl-pyrrolidine-2,5-dione)), poly-4,4'-yl-((1,1'-decane-1,10-diyl)-bis-(3-methyl-pyrrolidine-2,5-dione)) and poly-[4-N-butylamino-yl-4'-yl-((1,1'-decane-1,10-diyl)-bis-(3-methyl-pyrrolidine-2,5-dione))]-co-[4,4'-yl-((1,1'-decane-1,10-diyl)-bis-(3-methyl-pyrrolidine-2,5-dione))]

An intermediate of di (amic acid) was prepared via reaction between monoanhydride and diamine. First, 2.2416 g of commercially available citraconic anhydride (0.02 mole) was dissolved in 20 g isopropanol in a single-neck flask along with a magnetic stirring bar. Then, 1.7231 grams of commercially available 1,10-diaminodecane (0.01 mole) was dissolved in 35 grams of isopropanol and then added drop wise into the solution over a one hour period at room temperature. The flask was kept stirring continuously for another two hours. Light yellow precipitates appeared in 5 minutes. The intermediate was kept in solution and used for the next step. A small amount of intermediate reaction product was isolated by evaporation of methanol in the hood, and then methanol was completely removed in a vacuum oven at 50° C. overnight. Baeyer test result was positive, which confirmed the existence of C=C double bonds at this stage.

An intermediate prepared above was used to get poly (amic acid) as follows. First, with the addition of 35 g isopropanol, the di (amic acid) suspension obtained above dissolved and formed a solution, which contained 3.9647 g of intermediate (0.01 mole). The solution was cooled down in an ice bath in a single-neck flask along with a magnetic stirring bar. Then, 0.7314 g of commercially available n-butylamine (0.01 mole) was dissolved in 5 g of isopropanol and added slowly into the cooled solution with stirring. The solution was clear and the addition of n-butylamine required about two hours, and the ice bath conditions were maintained for another one hour after the addition to ensure the complete reaction. Baeyer test result was positive, which confirmed the existence of C=C double bonds at this stage.

The intermediate/isopropanol solution prepared in the second step was used to prepare polyimide film via thermal imidization. First, isopropanol alcohol in the poly (amic acid)/isopropanol alcohol solution was removed by evaporation at room temperature. Then, the viscous light yellow liquid was kept at 60° C. for 2 hours, and temperature was ramped to 220° C. at a rate of 3° C./min. Finally, an amber color flexible film was formed and this film was analyzed by Thermogravimetric Analysis (TGA) and Differential Scanning Calorimetry (DSC). The Tg is 52° C. TGA showed a 5% weight loss at 312° C. and a 10% weight loss at 401° C.

This alternative synthetic sequence as exhibited in the Example 6 and 7 as a di(amic acid) formed first and then followed by the addition of a monoamine gaves a polymeric material that has a lower Tg and lower weight loss temperature (at 10% weight loss) than the polymeric material described in Example 1, which is prepared via the addition of a monoamine first followed by reaction with a diamine, and then finally by imidization. Both are high molecular weight films as demonstrated by their flexible nature.

Example 8, A Confirmation of Example 7 to Demonstrate Reproducibility: Mixture of Poly-4-N-butylamino-yl-4'-yl-((1,1'-decane-1,10-diyl)-bis-(3-methyl-pyrrolidine-2,5-dione)), poly-4,4'-yl-((1,1'-decane-1,10-diyl)-bis-(3-methyl-pyrrolidine-2,5-dione)) and poly-[4-N-butylamino-yl-4'-yl-((1,1'-decane-1,10-diyl)-bis-(3-methyl-pyrrolidine-2,5-dione))]-co-[4,4'-yl-((1,1'-decane-1,10-diyl)-bis-(3-methyl-pyrrolidine-2,5-dione))]

An intermediate of di (amic acid) was prepared via reaction between monoanhydride and diamine. First, 2.2416 g of commercially available citraconic anhydride (0.02 mole) was dissolved in 10 g isopropanol in a single-neck flask along with a magnetic stirring bar. Then, 1.7231 grams of commercially available 1,10-diaminodecane (0.01 mole) was dissolved in 35 grams of isopropanol and then added dropwise into the solution over a one hour period. After the addition of 1,10-diaminodecane/isopropanol solution, the flask was kept stirring continuously for another two hours. A white precipitate appeared in 5 minutes. The intermediate was kept in solution and used for the next step. A small amount of intermediate reaction product was isolated for IR and GC-MS analysis by evaporation of isopropanol in the hood, and then solvent was completely removed in a vacuum oven at 50° C. overnight. IR and GC-MS data showed the pretence of a ring-opened amide. GC-MS also showed the pretence of the starting materials-anhydride and amine. It would appear that the product is thermal labile and might break down to reform the starting materials. The FT-IR spectrum represented the addition of the amine to one side of the opened citraconic anhydride ring, forming an amide. Baeyer test result was positive, which confirmed the existence of C=C double bonds at this stage.

The intermediate prepared above was used to react with a monoamine as follows. First, this suspension which contained 3.9647 g of half ester intermediate (0.01 mole) was added to additional amount of isopropanol (35 g) in a single-neck flask along with a magnetic stirring bar and cooled down in an ice bath. Then, 0.7314 g of commercially available n-butylamine (0.01 mole) was dissolved in 5 g of isopropanol and added slowly into the cooled solution with stirring. The solution was clear and the addition of n-butylamine required about two hours, and the ice bath conditions were maintained for another one hour after the addition to ensure the complete reaction. The FT-IR spectrum represented the addition of the amine to one side of the opened citraconic anhydride ring, forming an amide. Baeyer test result was positive, which confirmed the existence of C=C double bonds at this stage.

The intermediate obtained in the second step was used to prepare polyimide film via thermal imidization. First, isopropanol in the solution was removed by evaporation at room temperature. Then, the viscous light yellow liquid was kept at 60° C. for 2 hours, and temperature was ramped to 220° C. at a rate of 3° C./min. Finally, an amber color flexible film was formed. The imidization kinetics was studied by taking samples at different temperatures. The final film is insoluble in most solvents, such as methylpyrrolidone, methylene chloride, THF, DMF and etc. But the samples taken in the range of 170° C. to 210° C. were soluble in DMF. All the samples taken at different temperatures in the range of 170° C. to 220° C. were analyzed via Baeyer test to investigate the reaction mechanism by studying when C=C bonds disappeared. All samples in the range of 170° C. to 200° C. showed positive results, confirming the presence of C=C bonds. The sample taken at 210° C.

showed a negative result, suggesting C=C bonds disappeared at this stage. In consistent with the Baeyer test, IR spectra showed the presence of C=C double bonds at lower temperature (170° C.). But no C=C peak at high temperature (220° C.) but imide pretence were observed in IR spectrum. DSC result showed a Tg of 54° C.

Example 9: Mixture of poly-4-N-tetradecylaminoyl-4'-yl-((1,1'-decane-1,10-diyl)-bis-(3-methyl-pyrrolidine-2,5-dione)), poly-4,4'-yl-((1,1'-decane-1,10-diyl)-bis-(3-methyl-pyrrolidine-2,5-dione)) and poly-[4-N-tetradecylamino-yl-4'-yl-((1,1'-decane-1,10-diyl)-bis-(3-methyl-pyrrolidine-2,5-dione))]-co-[4,4'-yl-((1,1'-decane-1,10-diyl)-bis-(3-methyl-pyrrolidine-2,5-dione))]

An intermediate of di (amic acid) was prepared via reaction between monoanhydride and diamine. First, 2.2416 g of commercially available citraconic anhydride (0.02 mole) was dissolved in 10 g isopropanol in a single-neck flask along with a magnetic stirring bar. Then, 1.7231 grams of commercially available 1,10-diaminodecane (0.01 mole) was dissolved in 35 grams of isopropanol and then added dropwise into the solution over one hour period. The flask was kept stirring continuously for another two hours. A white precipitate appeared in 5 minutes. The intermediate was kept in solution and used for the next step. A small amount of intermediate reaction product was isolated for IR and GC-MS analysis by evaporation of isopropanol in the hood, and then isopropanol was completely removed in a vacuum oven at 50° C. overnight. IR and GC-MS data showed the pretence of a ring-opened amide. GC-MS also showed the pretence of the starting materials-anhydride and amine. It would appear that the product is thermal labile and might break down to reform the starting materials. The FT-IR spectrum represented the addition of the amine to one side of the opened citraconic anhydride ring, forming an amide. Baeyer test result was positive, which confirmed the existence of C=C double bonds at this stage.

The intermediate prepared above was used to react with a monoamine as follows. First, this suspension which contained 3.9647 g of half ester intermediate (0.01 mole) was added to additional amount of isopropanol (35 g) in a single-neck flask along with a magnetic stirring bar and cooled down in an ice bath. Then, 2.1341 g of commercially available n-tetradecylamine (0.01 mole) was dissolved in 5 g of isopropanol and added slowly into the cooled solution with stirring. The solution was clear and the addition of n-tetradecylamine required about two hours, and the ice bath conditions were maintained for another one hour after the addition to ensure the complete reaction. The FT-IR spectrum represented the addition of the amine to one side of the opened citraconic anhydride ring, forming an amide. Differences and similarities between Examples 21 and 22 (below) exist. However, the variations cannot be correlated to the amine used. Baeyer test result was positive, which confirmed the existence of C=C double bonds at this stage.

The intermediate obtained in the second step was used to prepare polyimide film via thermal imidization. First, isopropanol in the solution was removed by evaporation at room temperature. Then, the viscous light yellow liquid was kept at 60° C. for 2 hours, and temperature was ramped to 220° C. at a rate of 3° C./min. Finally, an amber colored flexible film was formed. The imidization kinetics was studied by taking samples at different temperatures. The final film is insoluble in most solvents, such as Methylpyrrolidone, methylene chloride, THF, DMF and etc. But the samples taken in the range of 170° C. to 210° C. were soluble in DMF. All the samples taken at different temperatures in the range of 170° C. to 220° C. were analyzed via Baeyer test to investigate the reaction mechanism by studying when C=C bonds disappeared. All samples in the range of 170° C. to 200° C. showed positive results, confirming the presence of C=C bonds. The sample taken at 210° C. showed a negative result, suggesting C=C bonds disappeared at this stage. In consistent with the Baeyer test, IR spectra showed the presence of C=C double bonds at lower temperature (170° C.). But no C=C peak at high temperature (220° C.) but imide presence were observed in IR spectrum.

Example 10: Mixture of poly-4-N-butylamino-yl-4'-yl-((1,1'-decane-1,10-diyl)-bis-(3-methyl-pyrrolidine-2,5-dione)), poly-4,4'-yl-((1,1'-decane-1,10-diyl)-bis-(3-methyl-pyrrolidine-2,5-dione)) and poly-[4-N-butylamino-yl-4'-yl-((1,1'-decane-1,10-diyl)-bis-(3-methyl-pyrrolidine-2,5-dione))]-co-[4,4'-yl-((1,1'-decane-1,10-diyl)-bis-(3-methyl-pyrrolidine-2,5-dione))]

An intermediate of di (amic acid) was prepared via reaction between a monoanhydride and a diamine. First, 2.2416 g of commercially available citraconic anhydride (0.02 mole) was dissolved in 10 g tetrahydrofuran in a single-neck flask along with a magnetic stirring bar. Then, 1.7231 grams of commercially available 1,10-diaminodecane (0.01 mole) was dissolved in 35 grams of tetrahydrofuran and then added dropwise into the solution over a one hour period. The flask was kept stirring continuously for another two hours. A white precipitate appeared in 5 minutes. The intermediate was kept in solution and used for the next step. A small amount of intermediate reaction product was isolated for analysis by evaporation of THF in the hood, and then THF was completely removed in a vacuum oven at 50° C. overnight. Baeyer test result was positive, which confirmed the existence of C=C double bonds at this stage.

The intermediate prepared above was used to react with a monoamine as follows. First, this suspension which contained 3.9647 g of half ester intermediate (0.01 mole) was added to additional amount of THF (40 g) in a single-neck flask along with a magnetic stirring bar and cooled down in an ice bath. Then, 0.7314 g of commercially available n-butylamine (0.01 mole) was dissolved in 5 g of tetrahydrofuran and added slowly into the cooled solution with stirring. The solution was clear and the addition of n-butylamine required about two hours, and the ice bath conditions were maintained for another one hour after the addition to ensure the complete reaction. The FT-IR spectrum represented the addition of the amine to one side of the opened citraconic anhydride ring, forming an amide. Differences and similarities between example 21, 22 and 23 exist. However, the variations cannot be correlated to the amine used or with the solvent. Baeyer test result was positive, which confirmed the existence of C=C double bonds at this stage.

The intermediate obtained in the second step was used to prepare polyimide film via thermal imidization. First, THF in the solution was removed by evaporation at room temperature. Then, the viscous light yellow liquid was kept at 60° C. for 2 hours, and temperature was ramped to 270° C. at a rate of 3° C./min. The final material is still a liquid even at 270° C. When the material is cooled down to room temperature, it solidifies and turns into an orange colored solid instead of a film. Later we were able to obtain high molecular weight films by using THF as a solvent, so it is not clear what occurred during this synthesis. The imidization kinetics was studied by taking samples at different temperatures. All the samples taken at different temperatures in the range of 170° C. to 270° C. were analyzed via Baeyer test to investigate the reaction mechanism by studying when C=C bonds disappeared. All of them showed positive results, confirming the presence of C=C bonds even at 270° C. IR spectra showed the presence of amide at 140° C. but non-amide and very less imide at 270° C. DSC result showed a Tg of 62° C.

Example 11: Mixture of poly-4-N-butylamino-yl-4'-yl-((1,1'-ethane-1,2-diyl)-bis-(3-methyl-pyrrolidine-2,5-dione)), poly-4,4'-yl-((1,1'-ethane-1,2-diyl)-bis-(3-methyl-pyrrolidine-2,5-dione)) and poly-[4-N-butylamino-yl-4'-yl-((1,1'-ethane-1,2-diyl)-bis-(3-methyl-pyrrolidine-2,5-dione))]-co-[4,4'-yl-((1,1'-ethane-1,2-diyl)-bis-(3-methyl-pyrrolidine-2,5-dione))]

An intermediate was prepared as follows. First, 2.2416 g of commercially available citraconic anhydride (0.02 mole) was dissolved in 10 g isopropanol in a single-neck flask along with a magnetic stirring bar. The flask was cooled down in an ice bath with magnetic agitation. Then, 0.7314 g of commercially available n-butylamine (0.01 mole) was dissolved in 5 g of methanol and added slowly into the cooled citraconic anhydride solution with stirring. The solution was clear and the addition of n-butylamine required about two hours, and the ice bath conditions were maintained for another one hour after the addition to ensure complete reaction. Note that this reaction was observed to be exothermic, so were other reactions between anhydrides and amine at this temperature. The intermediate was kept in solution and used as is for the next step. A small amount of intermediate was isolated for analysis by evaporation of methanol in the hood, and then complete removal of methanol was accomplished in a vacuum oven at 50° C. overnight. The Baeyer test of this intermediate showed a positive result which indicated the presence of C=C.

The ring opened intermediate I solution was used to react with a diamine. First, the intermediate I solution which contained 2.9730 grams of the intermediate I (0.01 mole) prepared as above was cooled down in ice bath with magnetic stirring. Second, 0.6010 grams of commercially available ethylenediamine (0.01 mole) was dissolved in 15 grams of isopropanol and then added drop wise into the intermediate reaction product/methanol solution in ice bath over a one hour period. The flask was removed from the ice bath with continuous stirring for another two hours. The product was kept in solution for the next imidization step. The Baeyer test of this intermediate II also showed a positive result, which suggested the C=C bonds were still present at this stage.

The intermediate II solution was used as it is without further processing to prepare polyimide film via thermal imidization. First, isopropanol in the solution was removed by evaporation at room temperature. Then, the viscous light yellow liquid was kept at 60° C. for 2 hours, and the temperature was ramped to 220° C. at a rate of 3° C./min. Finally, an amber-colored rigid film was formed and this film was analyzed by DSC and CHN analysis. Its thermoplastic behavior was demonstrated while being heated on a hot plate around 220° C. It can be softened, be bent and twisted during heating. The deformation is maintained if the film is cooled to room temperature, and its original shape can be recovered during a second heating. But the film became rigid immediately after removed from heat, which suggested a high Tg polymer is formed. DSC results showed a Tg of 151° C.

Example 12: Mixture of poly-4-N-butylamino-yl-4'-yl-((1,1'-ethane-1,2-diyl)-bis-(3-methyl-pyrrolidine-2,5-dione)), poly-4,4'-yl-((1,1'-ethane-1,2-diyl)-bis-(3-methyl-pyrrolidine-2,5-dione)) and poly-[4-N-butylamino-yl-4'-yl-((1,1'-ethane-1,2-diyl)-bis-(3-methyl-pyrrolidine-2,5-dione))]-co-[4,4'-yl-((1,1'-ethane-1,2-diyl)-bis-(3-methyl-pyrrolidine-2,5-dione))]

An intermediate of di (amic acid) was prepared via reaction between monoanhydride and diamine. First, 2.2416 g of commercially available citraconic anhydride (0.02 mole) was dissolved in 10 g isopropanol in a single-neck flask along with a magnetic stirring bar. Then, 0.6010 grams of commercially available ethylenediamine (0.01 mole) was dissolved in 15 grams of isopropanol and then added dropwise into the solution over a one hour period. After the addition of ethylenediamine/isopropanol solution, the flask was kept stirring continuously for another two hours. A white precipitate appeared in 5 minutes. The intermediate was kept in solution and used for the next step. Baeyer test result was positive, which confirmed the existence of C=C double bonds at this stage.

The intermediate prepared above was used to react with a monoamine as follows. First, this suspension which contained 2.8426 g of half ester intermediate (0.01 mole) was added to additional amount of isopropanol (35 g) in a single-neck flask along with a magnetic stirring bar and cooled down in an ice bath. Then, 0.7314 g of commercially available n-butylamine (0.01 mole) was dissolved in 5 g of isopropanol and added slowly into the cooled solution with stirring. The solution turned clear after the addition of n-butylamine. Baeyer test result was positive, which confirmed the existence of C=C double bonds at this stage.

The intermediate II solution was used as it is without further processing to prepare polyimide film via thermal imidization. First, isopropanol in the solution was removed by evaporation at room temperature. Then, the viscous light yellow liquid was kept at 60° C. for 2 hours, and then the temperature was ramped to 220° C. at a rate of 3° C./min. Finally, an amber-colored rigid film was formed and this film was analyzed by DSC and CHN analysis. Its thermoplastic behavior was demonstrated while being heated on a hot plate around 220° C. It can be softened, be bent and twisted during heating. The deformation is maintained if the film is cooled to room temperature, and its original shape can be recovered during a second heating. But the film became rigid immediately after removed from heat, which suggested a high Tg polymer is formed. DSC results showed a Tg of 185° C.

Example 13: Mixture of poly-4-N-butylamino-yl-4'-yl-((1,1'-butane-1,4-diyl)-bis-(3-methyl-pyrrolidine-2,5-dione)), poly-4,4'-yl-((1,1'-butane-1,4-diyl)-bis-(3-methyl-pyrrolidine-2,5-dione)) and poly-[4-N-butylamino-yl-4'-yl-((1,1'-butane-1,4-diyl)-bis-(3-methyl-pyrrolidine-2,5-dione))]-co-[4,4'-yl-((1,1'-butane-1,4-diyl)-bis-(3-methyl-pyrrolidine-2,5-dione))]

An intermediate was prepared as follows. First, 2.2416 g of commercially available citraconic anhydride (0.02 mole)

was dissolved in 10 g isopropanol in a single-neck flask along with a magnetic stirring bar. The flask was cooled down in an ice bath with magnetic agitation. Then, 0.7314 g of commercially available n-butylamine (0.01 mole) was dissolved in 5 g of methanol and added slowly into the cooled citraconic anhydride solution with stirring. The solution was clear and the addition of n-butylamine required about two hours, and the ice bath conditions were maintained for another one hour after the addition to ensure complete reaction. Note that this reaction was observed to be exothermic, so were other reactions between anhydrides and amine at this temperature. The intermediate was kept in solution and used as it is for the next step. A small amount of intermediate was isolated for analysis by evaporation of methanol in the hood, and then complete removal of methanol was accomplished in a vacuum oven at 50° C. overnight. The Baeyer test of this intermediate showed a positive result which indicated the presence of C=C.

The ring opened intermediate I solution was used to react with a diamine. First, the intermediate I/methanol solution which contained 2.9730 grams of the intermediate I (0.01 mole) prepared as above was cooled down in ice bath with magnetic stirring. Second, 0.8815 grams of commercially available 1,4-diaminobutane (0.01 mole) was dissolved in 15 grams of isopropanol and then added drop wise into the intermediate reaction product solution in ice bath over a one hour period. The flask was removed from the ice bath with continuous stirring for another two hours. The product was kept in solution for the next imidization step. The Baeyer test of this intermediate II also showed a positive result, which suggested the C=C bonds were still present at this stage.

The intermediate II solution was used as it is without further processing to prepare polyimide film via thermal imidization. First, isopropanol in the solution was removed by evaporation at room temperature. Then, the viscous, light-yellow liquid was kept at 60° C. for 2 hours, and the temperature was ramped to 220° C. at a rate of 3° C./min. Finally, an amber-colored rigid film was formed and this film was analyzed by DSC and CHN analysis. Its thermoplastic behavior was demonstrated while being heated on a hot plate around 220° C. It can be softened, be bent and twisted during heating. The deformation is maintained if the film is cooled to room temperature, and its original shape can be recovered during a second heating. Tg is 147° C.

Example 14: Mixture of poly-4-N-butylamino-yl-4'-yl-((1,1'-butane-1,4-diyl)-bis-(3-methyl-pyrrolidine-2,5-dione)), poly-4,4'-yl-((1,1'-butane-1,4-diyl)-bis-(3-methyl-pyrrolidine-2,5-dione)) and poly-[4-N-butylamino-yl-4'-yl-((1,1'-butane-1,4-diyl)-bis-(3-methyl-pyrrolidine-2,5-dione))]-co-[4,4'-yl-((1,1'-butane-1,4-diyl)-bis-(3-methyl-pyrrolidine-2,5-dione))]

An intermediate of di (amic acid) was prepared via reaction between monoanhydride and diamine. First, 2.2416 g of commercially available citraconic anhydride (0.02 mole) was dissolved in 10 g isopropanol in a single-neck flask along with a magnetic stirring bar. Then, 0.8815 grams of commercially available 1,4 diaminobutane (0.01 mole) was dissolved in 15 grams of isopropanol and then added dropwise into the solution over a one hour period. After the addition of ethylenediamine/isopropanol solution, the flask was kept stirring continuously for another two hours. A white precipitate appeared in 5 minutes. The intermediate was kept in solution and used for the next step. Baeyer test result was positive, which confirmed the existence of C=C double bonds at this stage.

The intermediate prepared above was used to react with a monoamine as follows. First, this suspension which contained 3.1231 g of half ester intermediate (0.01 mole) was added to additional amount of isopropanol (35 g) in a single-neck flask along with a magnetic stirring bar and cooled down in an ice bath. Then, 0.7314 g of commercially available n-butylamine (0.01 mole) was dissolved in 5 g of isopropanol and added slowly into the cooled solution with stirring. The solution turned clear after the addition of n-butylamine. Baeyer test result was positive, which confirmed the existence of C=C double bonds at this stage.

The intermediate II solution was used as it is without further processing to prepare polyimide film via thermal imidization. First, isopropanol in the solution was removed by evaporation at room temperature. Then, the viscous, light-yellow liquid was kept at 60° C. for 2 hours, and the temperature was ramped to 220° C. at a rate of 3° C./min. Finally, an amber-colored rigid film was formed and this film was analyzed by DSC and CHN analysis. Its thermoplastic behavior was demonstrated while being heated on a hot plate around 220° C. It can be softened, be bent and twisted during heating. The deformation is maintained if the film is cooled to room temperature, and its original shape can be recovered during a second heating. Tg is 141° C.

Example 15: Mixture of poly-4-N-butylamino-yl-4'-yl-((1,1'-hexane-1,6-diyl)-bis-(3-methyl-pyrrolidine-2,5-dione)), poly-4,4'-yl-((1,1'-hexane-1,6-diyl)-bis-(3-methyl-pyrrolidine-2,5-dione)) and poly-[4-N-butylamino-yl-4'-yl-((1,1'-hexane-1,6-diyl)-bis-(3-methyl-pyrrolidine-2,5-dione))]-co-[4,4'-yl-((1,1'-hexane-1,6-diyl)-bis-(3-methyl-pyrrolidine-2,5-dione))]

An intermediate was prepared as follows. First, 2.2416 g of commercially available citraconic anhydride (0.02 mole) was dissolved in 10 g isopropanol in a single-neck flask along with a magnetic stirring bar. The flask was cooled down in an ice bath with magnetic agitation. Then, 0.7314 g of commercially available n-butylamine (0.01 mole) was dissolved in 5 g of methanol and added slowly into the cooled citraconic anhydride solution with stirring. The solution was clear and the addition of n-butylamine required about two hours, and the ice bath conditions were maintained for another one hour after the addition to ensure complete reaction. Note that this reaction was observed to be exothermic, so were other reactions between anhydrides and amine at this temperature. The intermediate was kept in solution and used as it is for the next step. A small amount of intermediate was isolated for analysis by evaporation of methanol in the hood, and then complete removal of methanol was accomplished in a vacuum oven at 50° C. overnight. The Baeyer test of this intermediate showed a positive result which indicated the presence of C=C.

The ring opened intermediate I solution was used to react with a diamine. First, the intermediate I/methanol solution which contained 2.9730 grams of the intermediate I (0.01 mole) prepared as above was cooled down in ice bath with magnetic stirring. Second, 1.1621 grams of commercially available 1,6-hexamethylenediamine (0.01 mole) was dissolved in 15 grams of isopropanol and then added drop wise into the intermediate reaction product solution in ice bath over a one hour period. The flask was removed from the ice bath with continuous stirring for another two hours. The product was kept in solution for the next imidization step. The Baeyer test of this intermediate II also showed a positive result, which suggested that the C=C bonds were still present at this stage.

The intermediate II solution was used as it is without further processing to prepare polyimide film via thermal imidization. First, isopropanol in the solution was removed by evaporation at room temperature. Then, the viscous light yellow liquid was kept at 60° C. for 2 hours, and then the temperature was ramped to 220° C. at a rate of 3° C./min. Finally, an amber-colored rigid film was formed and this film was analyzed by DSC and CHN analysis. Its thermoplastic behavior was demonstrated while being heated on a hot plate around 220° C. It can be softened, be bent and twisted during heating. The deformation is maintained if the film is cooled to room temperature, and its original shape can be recovered during a second heating. Tg is 136° C.

Example 16: Same as Example 15

An intermediate of di (amic acid) was prepared via reaction between monoanhydride and diamine. First, 2.2416 g of commercially available citraconic anhydride (0.02 mole) was dissolved in 10 g isopropanol in a single-neck flask along with a magnetic stirring bar. Then, 1.1621 grams of commercially available 1,6-hexamethylenediamine (0.01 mole) was dissolved in 15 grams of isopropanol and then added dropwise into the solution over a one hour period. After the addition of 1,6-hexamethylenediamine/isopropanol solution, the flask was kept stirring continuously for another two hours. A white precipitate appeared in 5 minutes. The intermediate was kept in solution and used for the next step. Baeyer test result was positive, which confirmed the existence of C=C double bonds at this stage.

The intermediate prepared above was used to react with a monoamine as follows. First, this suspension which contained 3.4037 g of half ester intermediate (0.01 mole) was added to additional amount of isopropanol (35 g) in a single-neck flask along with a magnetic stirring bar and cooled down in an ice bath. Then, 0.7314 g of commercially available n-butylamine (0.01 mole) was dissolved in 5 g of isopropanol and added slowly into the cooled solution with stirring. The solution turned clear after the addition of n-butylamine. Baeyer test result was positive, which confirmed the existence of C=C double bonds at this stage.

The intermediate II solution was used as it is without further processing to prepare polyimide film via thermal imidization. First, isopropanol in the solution was removed by evaporation at room temperature. Then, the viscous light yellow liquid was kept at 60° C. for 2 hours, and the temperature was ramped to 220° C. at a rate of 3° C./min. Finally, an amber-colored rigid film was formed and this film was analyzed by DSC and CHN analysis. Its thermoplastic behavior was demonstrated while being heated on a hot plate around 220° C. It can be softened, be bent and twisted during heating. The deformation is maintained if the film is cooled to room temperature, and its original shape can be recovered during a second heating. Tg is 116° C.

Example 17: Mixture of poly-4-N-butylamino-yl-4'-yl-((1,1'-nonane-1,9-diyl)-bis-(3-methyl-pyrrolidine-2,5-dione)), poly-4,4'-yl-((1,1'-nonane-1,9-diyl)-bis-(3-methyl-pyrrolidine-2,5-dione)) and poly-[4-N-butylamino-yl-4'-yl-((1,1'-nonane-1,9-diyl)-bis-(3-methyl-pyrrolidine-2,5-dione))]-co-[4,4'-yl-((1,1'-nonane-1,9-diyl)-bis-(3-methyl-pyrrolidine-2,5-dione))]

An intermediate of amic-acid was prepared via reaction between mono-anhydride and diamine. First, 1.1210 g of commercially available citraconic anhydride (0.01 mole) was dissolved in 10 g methanol in a single-neck flask along with a magnetic stirring bar. Then, 0.7917 grams of commercially available 1,9-diaminononane (0.005 mole) was dissolved in 20 grams of methanol and then added dropwise into the solution over a one hour period at room temperature. The flask was kept stirring continuously for another two hours. The reaction was exothermic. The intermediate was kept in solution and used for the next step. Baeyer test result was positive, which confirmed the existence of C=C double bonds at this stage. An intermediate prepared above was used to react with a monoamine as follows. 0.3659 g of commercially available n-butylamine (0.005 mole) was dissolved in 5 g of methanol and added slowly into the clear intermediate solution (containing 1.9127 grams intermediate) with stirring. The addition of n-butylamine required about two hours. The intermediate obtained via the reaction with n-butylamine was used to prepare polyimide film via thermal imidization. First, methanol in the poly (amic acid)/methanol solution was removed by evaporation at room temperature. Then, the viscous light yellow liquid was kept at 60° C. under vacuum for 2 hours, and then the temperature was ramped to 220° C. at a rate of 3° C./min. Finally, an amber-colored flexible film was formed. FT-IR spectrum showed mainly imide functionality at 1701 cm$^{-1}$ and minor amide functionality at 1540 cm$^{-1}$. DSC gave a Tg of 86° C.

Example 18: Mixture of poly-4-N-butylamino-yl-4'-yl-(1,1'-bis-trimethylene polydimethyl siloxane-bis-(3-methyl-pyrrolidine-2,5-dione)), poly-4,4'-yl-((1,1'-bis-trimethylene polydimethyl siloxane)-bis-(3-methyl-pyrrolidine-2,5-dione)) and poly-[4-N-butylamino-yl-4'-yl-(1,1'-bis-trimethylene polydimethyl siloxane-bis-(3-methyl-pyrrolidine-2,5-dione))]-co-[4,4'-yl-(1,1'-bis-trimethylene polydimethyl siloxane-bis-(3-methyl-pyrrolidine-2,5-dione))]

An amic-acid intermediate was prepared as follows. First, 0.5604 g of commercially available citraconic anhydride (0.005 mole) was dissolved in 10 g methanol in a single-neck flask along with a magnetic stirring bar. Then, 2.2015 grams of commercially available aminopropyl terminated polydimethylsiloxanes (DMS All from Gelest, Inc., Morrisville, Pa. MW=850-900 g/mole, around 0.0025 mole) was dissolved in 20 grams of methanol and then added dropwise into the solution over a one hour period. The flask was kept stirring continuously for another two hours. The solution was clear. The reaction was noticed as being exothermic. The intermediate was kept in solution and used for the next step. The intermediate prepared above was used to react with a monoamine as follows. 0.3659 g of commercially available n-butylamine (0.005 mole) was dissolved in 5 g of methanol and added slowly into the clear intermediate solution (containing 2.7619 grams intermediate) with stirring. The addition of n-butylamine required about two hours. The intermediate obtained via the reaction with n-butylamine was used to prepare polyimide film via thermal imidization. First, methanol in the poly (amic acid)/methanol solution was removed by evaporation at room temperature. Then, the viscous light yellow liquid was kept at 60° C. under vacuum for 2 hours, and then the temperature was ramped to 220° C. at a rate of 3° C./min. Finally, an amber-colored, very soft and sticky film was formed. The film was sent for CHN elemental analysis to determine structure. FT-IR spectrum showed mainly imide functionality at 1711 cm$^{-1}$. DSC result showed no Tg transition above −30° C.

Example 19: Mixture of poly-4-N-butylamino-yl-4'-yl-(1,1'-polyoxypropylene-bis-(3-methyl-pyrrolidine-2,5-dione)), poly-4,4'-yl-((1,1'-polyoxypropylene)-bis-(3-methyl-pyrrolidine-2,5-dione)) and poly-[4-N-butylamino-yl-4'-yl-(1,1'-polyoxypropylene-bis-(3-methyl-pyrrolidine-2,5-dione))]-co-[4,4'-yl-(1,1'-polyoxypropylene-bis-(3-methyl-pyrrolidine-2,5-dione))]

An amic-acid intermediate was prepared as follows. First, 1.1208 g of commercially available citraconic anhydride (0.01 mole) was dissolved in 10 g methanol in a single-neck flask along with a magnetic stirring bar. Then, 1.1509 grams of commercially available Jeffamine® D-230 Polyetheramine from Huntsman, The Woodlands, Tex. (MW=230 g/mole, 0.005 mole) was dissolved in 20 grams of methanol and then added dropwise into the solution over a one hour period. The flask was kept stirring continuously for another two hours. The solution was in very light yellow color, and no precipitate was observed. The reaction was noticed as being exothermic. The intermediate was kept in solution and used for the next step. The intermediate prepared above was used to react with a monoamine as follows. 0.3659 g of commercially available n-butylamine (0.005 mole) was dissolved in 5 g of methanol and added slowly into the clear intermediate solution (containing 2.2717 grams intermediate) with stirring. The addition of n-butylamine required about two hours. The intermediate obtained via the reaction with n-butylamine was used to prepare polyimide film via thermal imidization. First, methanol in the solution was removed by evaporation at room temperature. Then, the viscous light yellow liquid was kept at 60° C. under vacuum for 2 hours, and heated to 220° C. at a rate of 3° C./min. The final material is an amber-colored soft film, which indicated a low Tg. The film was sent for CHN elemental analysis to determine structure. DSC result showed a Tg transition of 38° C. FT-IR spectrum showed mainly imide functionality at 1700 cm$^{-1}$ and minor amide functionality at 1535 cm$^{-1}$.

Example 20: Mixture of poly-4-N-butylamino-yl-4'-yl-((1,1'-dodecane-1,12-diyl)-bis-(3-methyl-pyrrolidine-2,5-dione)), poly-4,4'-yl-((1,1'-dodecane-1,12-diyl)-bis-(3-methyl-pyrrolidine-2,5-dione)) and poly-[4-N-butylamino-yl-4'-yl-((1,1'-dodecane-1,12-diyl)-bis-(3-methyl-pyrrolidine-2,5-dione))]-co-[4,4'-yl-((1,1'-dodecane-1,12-diyl)-bis-(3-methyl-pyrrolidine-2,5-dione))]

An amic-acid intermediate was prepared as follows. First, 1.1208 g of commercially available citraconic anhydride (0.01 mole) was dissolved in 10 g methanol in a single-neck flask along with a magnetic stirring bar. Then, 1.0020 grams of commercially available 1,12-diaminododecane (0.005 mole) was dissolved in 20 grams of methanol and then added dropwise into the solution over a one hour period. The flask was kept stirring continuously for another two hours. A white precipitate appeared in 5 minutes. The reaction was noticed as being exothermic. The intermediate was kept in solution and used for the next step. The intermediate prepared above was used to react with a monoamine as follows. 0.3659 g of commercially available n-butylamine (0.005 mole) was dissolved in 5 g of methanol and added slowly into the intermediate solution (containing 2.1228 grams intermediate) with stirring. The addition of n-butylamine required about two hours. The intermediate obtained via the reaction with n-butylamine was used to prepare polyimide film via thermal imidization. First, methanol in the solution was removed by evaporation at room temperature. Then, the viscous, light-yellow liquid was kept at 60° C. under vacuum for 2 hours, and heated to 220° C. at a rate of 3° C./min. The final material is an amber-colored flexible film. The film was sent for CHN elemental analysis to determine structure. DSC result showed a Tg transition of 58° C.

Examples 21 and 22: First Method, Second Embodiment

Below is the reaction scheme for Examples 21 and 22.

Reaction Scheme for Examples 21 and 22

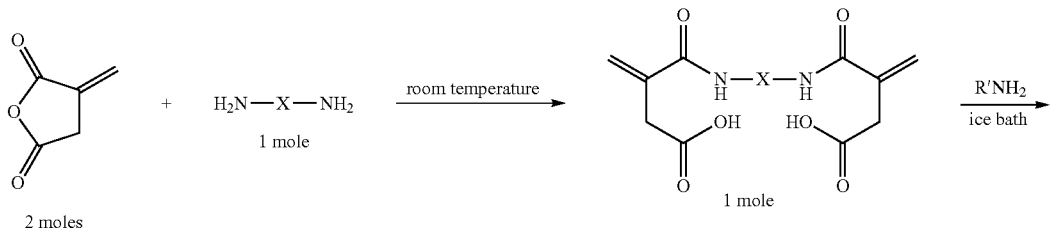

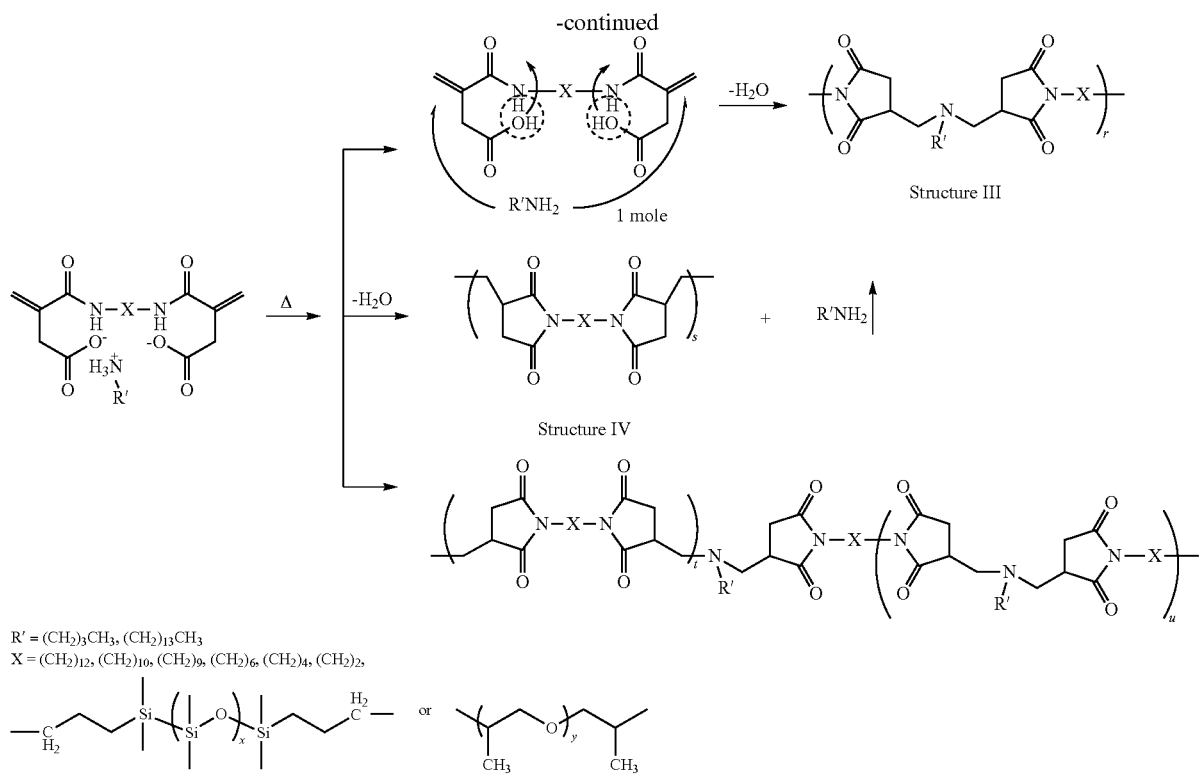

wherein r is greater than about 20 and preferably greater than about 150, wherein s is greater than about 20 and preferably greater than about 150, wherein t+u are greater than about 20 and preferably greater than about 150, wherein x can be 1 to 1000, desirably about 5 to about 25, and preferably about 8 to about 14, and wherein y can be 1 to 100, desirably about 2 to about 35, and preferably about 2 to about 8.

Example 21: Mixture of poly-3-N-butylamino-methylene-3'-methylene-((1,1'-decane-1,10-diyl)-bis-(pyrrolidine-2,5-dione)), poly-3,3'-methylene-((1,1'-decane-1,10-diyl)-bis-(pyrrolidine-2,5-dione)), and poly-[3-N-butylamino-methylene-3'-methylene-((1,1'-decane-1,10-diyl)-bis-(pyrrolidine-2,5-dione))]-co-[3,3'-methylene-((1,1'-decane-1,1-diyl)-bis-(pyrrolidine-2,5-dione))]

An amic-acid intermediate was prepared as follows. First, 1.1208 g of commercially available itaconic anhydride (0.01 mole) was dissolved in 10 g methanol in a single-neck flask along with a magnetic stirring bar. Then, 0.8617 grams of commercially available 1,10-diaminodecane (0.005 mole) was dissolved in 20 grams of methanol and then added dropwise into the solution over a one hour period. The flask was kept stirring continuously for another two hours. A white precipitate appeared in 5 minutes. The reaction was noticed as exothermic. The intermediate was kept in solution and used for the next step. The intermediate prepared above was used to react with a monoamine as follows. 0.3658 g of commercially available n-butylamine (0.005 mole) was dissolved in 5 g of methanol and added slowly into the intermediate solution (containing 1.9825 grams intermediate) with stirring. The addition of n-butylamine required about two hours. The intermediate obtained via the reaction with n-butylamine was used to prepare polyimide film via thermal imidization. First, methanol in the solution was removed by evaporation at room temperature. Then, the viscous light yellow liquid was kept at 60° C. under vacuum for 2 hours, and heated to 220° C. at a rate of 3° C./min. The final material is an amber-colored, slightly soft film. The film was sent for CHN elemental analysis to determine structure. DSC result showed a Tg transition of 48° C. FT-IR spectrum showed mainly imide functionality at 1701 cm$^{-1}$ and minor amide functionality at 1549 cm$^{-1}$.

Example 22: Mixture of poly-3-N-butylamino-methylene-3'-methylene-((1,1'-ethane-1,2-diyl)-bis-(pyrrolidine-2,5-dione)), poly-3,3'-methylene-((1,1'-ethane-1,2-diyl)-bis-(pyrrolidine-2,5-dione)), and poly-[3-N-butylamino-methylene-3'-methylene-((1,1'-ethane-1,2-diyl)-bis-(pyrrolidine-2,5-dione))]-co-[3,3'-methylene-((1,1'-ethane-1,2-diyl)-bis-(pyrrolidine-2,5-dione))]

An amic-acid intermediate was prepared as follows. First, 1.1208 g of commercially available itaconic anhydride (0.01 mole) was dissolved in 10 g methanol in a single-neck flask along with a magnetic stirring bar. Then, 0.3009 grams of commercially available ethylenediamine (0.005 mole) was dissolved in 20 grams of methanol and then added dropwise into the solution over a one hour period. The flask was kept stirring continuously for another two hours. A white precipitate appeared in 5 minutes. The reaction was noticed as being exothermic. The intermediate was kept in solution and used for the next step. The intermediate prepared above was used to react with a monoamine as follows. 0.3658 g of commercially available n-butylamine (0.005 mole) was dissolved in 5 g of methanol and added slowly into the intermediate solution (containing 1.4217 grams intermediate) with stirring. The addition of n-butylamine required about two hours. The intermediate obtained via the reaction with n-butylamine was used to prepare polyimide film via thermal imidization. First, methanol in the solution was removed by evaporation at room temperature. Then, the viscous light yellow liquid was kept at 60° C. under vacuum for 2 hours, and heated to 220° C. at a rate of 3° C./min. The final material is an amber-colored rigid film. The film was sent for CHN elemental analysis to determine structure. DSC result showed a Tg transition of 94° C. FT-IR spectrum showed mainly imide functionality at 1702 cm$^{-1}$ and minor amide functionality at 1554 cm$^{-1}$.

Summary of First Method

Little difference in structures and properties was found for intermediates and final polyimide films that were synthesized from the first and second embodiments of the first method, and within the first method, employing either sequence, meaning that the addition order of monoamine did not affect the final polyimide structures.

For the first embodiment of the first method, the final polymers would be a mixture of (a homopolymer with monomeric structure I, a homopolymer with monomeric structure II, and a random copolymer with both monomeric structures, as seen in the Reaction Schemes for Examples 1-5 and 6-20 with the only difference between the two sequences is the order of monoamine addition vs. diamine addition.

For the second embodiment of the first method, the final polymers become a mixture of a homopolymer with monomeric structure III, a homopolymer with monomeric structure IV, and a random copolymer with both monomeric structures III and IV, as seen in the Reaction Scheme for Examples 21-22 above.

The glass transition temperatures of Examples 1-22 and the theoretical CHN contents of each Example are shown below. The theoretical CHN contents were calculated based on the structures shown above, reproduced below as various Formulae for official naming purposes.

tents (both from proposed monomeric structure I and proposed monomeric structure II, in the Reaction Schemes above), and the actual CHN contents found from CHN elemental analysis were evaluated.

The total difference value between theoretical CHN contents (Formula AP-1 and Formula AP-2, respectively) and from the actual CHN contents were also calculated to show which structure is closer to the real structure. As shown in Table 1, the difference between theoretical values from Formula AP-1 and actual values is higher than the difference between theoretical values from Formula AP-2 and actual values, suggesting that in most cases, Formula AP-2 is more realistic.

These results for the first method indicate that monoamine participates and promotes the reaction but leaves the system somehow and it is not a part of the final structure. The relative ratio of the homopolymer of Formula AP-1 and the homopolymer of Formula AP-2 can be calculated based on the balance of each element. The estimated ratios of monomeric structure I and monomer structure II are also listed in Table 1.

Thus, it can be stated that Formula AP-2 fairly dominates the three possible imide polymers with a saturated hydrocarbon bridge as opposed to a monoamidic bridge of Formula AP-1. A random copolymer of Formula AP-3 is also probable to have a domination of Formula AP-2 over Formula AP-1.

The glass transition temperatures of polyimide samples made from this first method of the invention showed that Tg increased with decreasing chain length of diamines. In most cases, the second embodiment of the first method showed a slight higher Tg compared to the first embodiment of the first method when the same monomers and solvent were used. This gives one the ability to tailor Tg by proper monomer selection.

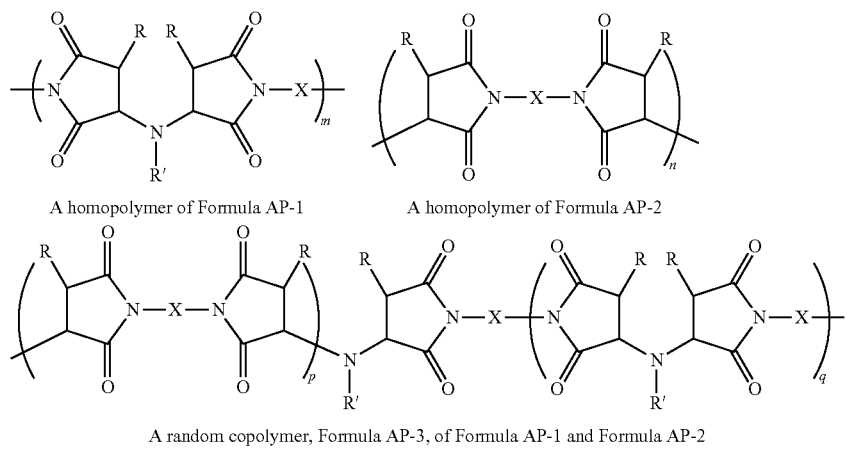

A homopolymer of Formula AP-1    A homopolymer of Formula AP-2

A random copolymer, Formula AP-3, of Formula AP-1 and Formula AP-2

Formula AP-1 shown below is obtained in the case that the monoamine is incorporated into the structure and forms the bridge between two imides.

Formula AP-2 shown below is obtained in the case that the monoamine participates in the reaction but is not incorporated into the final structure. In this structure, a saturated hydrocarbon bridge exists between the two imides. In order to find out which monomeric structure is more close to the real structure, the difference between theoretical CHN conwherein R, R' and X are as identified in Reaction Schemes 1-5 and 6-20, wherein m is greater than about 20 and preferably greater than about 150, wherein n is greater than about 20 and preferably greater than about 150, wherein p+q are greater than about 20 and preferably greater than about 150, wherein x can be 1 to 1000, desirably about 5 to about 25, and preferably about 8 to about 14, and wherein y can be 1 to 100, desirably about 2 to about 35, and preferably about 2 to about 8.

Comparably, the aliphatic polyimides resulting from the second embodiment of the first method, Reaction Scheme of Examples 21 and 22, can be either of two homopolymers or a random copolymer as shown here.

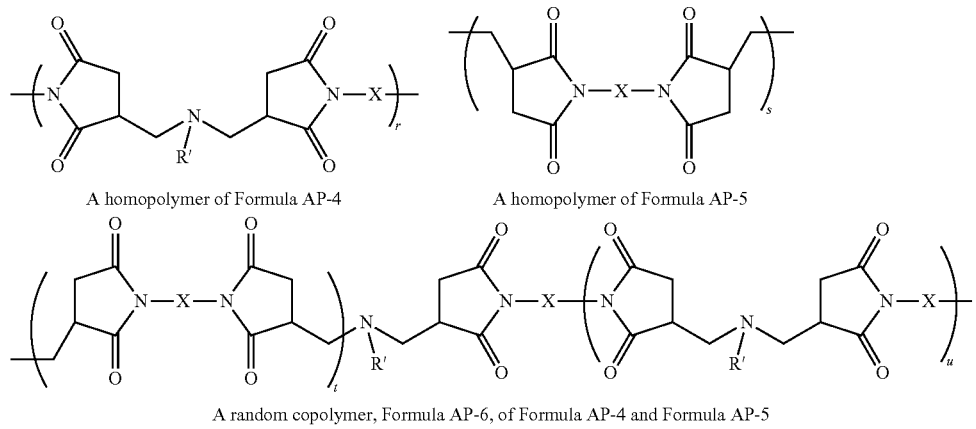

A homopolymer of Formula AP-4   A homopolymer of Formula AP-5

A random copolymer, Formula AP-6, of Formula AP-4 and Formula AP-5 wherein R, R' and X are as identified in Reaction Schemes 21-22, wherein r is greater than about 20 and preferably greater than about 150, wherein s is greater than about 20 and preferably greater than about 150, wherein t+u are greater than about 20 and preferably greater than about 150, wherein x can be 1 to 1000, desirably about 5 to about 25, and preferably about 8 to about 14, and wherein y can be 1 to 100, desirably about 2 to about 35, and preferably about 2 to about 8.

Formula AP-4 is similar to Formula AP-1, in that a monoaminic bridge exists between the two imides, but Formula AP-4 has flanking carbons between the nitrogen and the imide moieties.

Formula AP-5 is likewise similar to Formula AP-2, in that a saturated hydrocarbon bridge spans between the two imides, but Formula AP-5 has a methylene bridge but no alkyl substituent.

Table 1 provides the numerical results supporting the discussion above.

TABLE 1

| | | | | | | | |
|---|---|---|---|---|---|---|---|
| Tg and CHN contents of examples using First Method for Anhydride ||||||||
| | | Ratio of monomeric structure | | CHN Analysis ||||
| Example No., Composition & Solvent | Tg (° C.) | II/monomeric structure I (% of monomeric structure II) | % | Theoretical (Monomeric Structure I) % | Theoretical (Monomeric Structure II) % | Avg found % | \|Δ\| (Actual − Monomeric structure I) | \|Δ\| (Actual − Monomeric structure II) |
| 1, citraconic anhydride/n-butylamine/1,10 | 87 | 9.1 (90%) | C H N | 66.48 9.07 9.69 | 66.27 8.34 7.73 | 66.49 9.06 8.15 | 0.01 0.01 1.54 | 0.22 0.72 0.42 |
| diaminodecane 2/1/1 in MeOH | | | Total \|Δ\| (actual value − theoretical values) ||| | 1.56 | 1.36 |
| 2, maleic anhydride/n-butylamine/4- | 117 | 0.01 (1.4%) | C H N | 59.86 4.82 8.73 | 58.53 3.44 6.83 | 59.05 5.13 8.52 | 0.81 0.31 0.21 | 0.52 1.69 1.69 |
| aminophenyl sulfone 2/1/1 in MeOH | | | Total \|Δ\| (actual value − theoretical values) ||| | 1.33 | 3.90 |
| 3, maleic anhydride/n-butylamine/1,10 | 109 | 7.8 (89%) | C H N | 65.16 8.69 10.36 | 64.64 7.84 8.37 | 63.59 8.70 10.36 | 1.57 0.01 0.00 | 1.05 0.86 1.99 |
| diaminodecane 2/1/1 in MeOH | | | Total \|Δ\| (actual value − theoretical values) ||| | 1.58 | 3.9 |
| 4, citraconic anhydride/n-butylamine/1,10 | 54 | 8.9 (90%) | C H N | 66.48 9.07 9.69 | 66.27 8.34 7.73 | 66.79 8.37 8.46 | 0.31 0.7 1.23 | 0.52 0.03 0.73 |
| diaminodecane 2/1/1 in iPA | | | Total \|Δ\| (actual value − theoretical values) ||| | 2.24 | 1.28 |
| 6, citraconic | 58 | 8.9 (90%) | C | 66.48 | 66.27 | 66.88 | 0.40 | 0.61 |

TABLE 1-continued

Tg and CHN contents of examples using First Method for Anhydride

| | | | | | | | |
|---|---|---|---|---|---|---|---|
| anhydride/1,10 diaminodecane/ | | | H | 9.07 | 8.34 | 8.53 | 0.54 | 0.19 |
| | | | N | 9.69 | 7.73 | 8.58 | 1.11 | 0.85 |
| n-butylamine 2/1/1 in MeOH | | | Total \|Δ\| (actual value − theoretical values) | | | | 2.05 | 1.65 |
| 7, citraconic anhydride/1,10 diaminodecane/ | 52 | 8.9 (90%) | C | 66.48 | 66.27 | 66.77 | 0.29 | 0.5 |
| | | | H | 9.07 | 8.34 | 8.26 | 0.81 | 0.08 |
| | | | N | 9.69 | 7.73 | 8.38 | 1.31 | 0.65 |
| n-butylamine 2/1/1 in iPA | | | Total \|Δ\| (actual value − theoretical values) | | | | 2.41 | 1.23 |
| 8, citraconic anhydride/1,10 diaminodecane/ | 54 | 8.9 (90%) | C | 66.48 | 66.27 | 66.73 | 0.25 | 0.46 |
| | | | H | 9.07 | 8.34 | 8.24 | 0.83 | 0.1 |
| | | | N | 9.69 | 7.73 | 8.35 | 1.34 | 0.62 |
| n-butylamine 2/1/1 in iPA | | | Total \|Δ\| (actual value − theoretical values) | | | | 2.42 | 1.18 |
| 9, citraconic anhydride/1,10 diaminodecane/ tetradecylamine 2/1/1 in iPA | n/a | | C H N Total \|Δ\| (actual value − theoretical values) | | | | | |
| 10, citraconic anhydride/1,10 diaminodecane/ | 62 | 8.8 (90%) | C | 66.48 | 66.27 | 67.10 | 0.62 | 0.83 |
| | | | H | 9.07 | 8.34 | 7.92 | 1.15 | 0.42 |
| | | | N | 9.69 | 7.73 | 8.52 | 1.17 | 0.79 |
| n-butylamine 2/1/1 in THF | | | Total \|Δ\| (actual value − theoretical values) | | | | 2.94 | 2.04 |
| 11, citraconic anhydride/n-butylamine/ | 151 | 4.6 (82%) | C | 59.80 | 58.06 | 58.68 | 1.12 | 0.62 |
| | | | H | 7.21 | 4.87 | 6.30 | 0.91 | 1.43 |
| | | | N | 13.07 | 11.28 | 12.68 | 0.39 | 1.4 |
| ethylenediamine 2/1/1 in iPA | | | Total \|Δ\| (actual value − theoretical values) | | | | 2.42 | 3.45 |
| 12, citraconic anhydride/ethylenediamine/n- | 185 | 4.6 (82%) | C | 59.80 | 58.06 | 58.99 | 0.81 | 0.93 |
| | | | H | 7.21 | 4.87 | 6.18 | 1.03 | 1.31 |
| | | | N | 13.07 | 11.28 | 12.26 | 0.81 | 0.98 |
| butylamine 2/1/1 in iPA | | | Total \|Δ\| (actual value − theoretical values) | | | | 2.65 | 3.22 |
| 13, citraconic anhydride/n-butylamine/1,4 | 147 | 5.5 (85%) | C | 61.87 | 60.42 | 60.67 | 1.2 | 0.25 |
| | | | H | 7.78 | 6.52 | 6.58 | 1.2 | 0.06 |
| | | | N | 12.03 | 10.06 | 11.79 | 0.24 | 1.73 |
| diaminobutane 2/1/1 in iPA | | | Total \|Δ\| (actual value − theoretical values) | | | | 2.64 | 2.04 |
| 14, citraconic anhydride/1,4 diaminobutane/ | 141 | 5.6 (85%) | C | 61.87 | 60.42 | 60.79 | 1.08 | 0.37 |
| | | | H | 7.78 | 6.52 | 6.52 | 1.26 | 0 |
| | | | N | 12.03 | 10.06 | 11.47 | 0.56 | 1.41 |
| n-butylamine/ 1,4 diamino- butane 2/1/1 in iPA | | | Total \|Δ\| (actual value − theoretical values) | | | | 2.9 | 1.78 |
| 15, citraconic anhydride/n-butylamine/hexa- | 136 | 6.6 (87%) | C | 63.64 | 62.72 | 62.67 | 0.97 | 0.05 |
| | | | H | 8.28 | 7.24 | 7.21 | 1.07 | 0.03 |
| | | | N | 11.14 | 9.14 | 10.38 | 0.76 | 1.24 |
| methylene diamine 2/1/1 in iPA | | | Total \|Δ\| (actual value − theoretical values) | | | | 2.8 | 1.32 |
| 16, citraconic anhydride/hexa-methylene | 116 | 6.6 (87%) | C | 63.64 | 62.72 | 62.63 | 1.01 | 0.09 |
| | | | H | 8.28 | 7.24 | 7.28 | 1 | 0.04 |
| | | | N | 11.14 | 9.14 | 10.68 | 0.46 | 1.54 |
| diamine/n-butylamine 2/1/1 in iPA | | | Total \|Δ\| (actual value − theoretical values) | | | | 2.47 | 1.67 |

| Example No., Composition & Solvent | Tg (° C.) | CHN Analysis | | |
|---|---|---|---|---|
| | | C % | H % | N % |
| 5. Citraconic anhydride + n-butylamine + 1,9 diaminononane in MeOH | 83 | 66.16 | 8.09 | 9.34 |
| 17. Citraconic anhydride + 1,9 diaminononane + n-butylamine in MeOH | 86 | 66.04 | 8.08 | 9.28 |

TABLE 1-continued

| | Tg and CHN contents of examples using First Method for Anhydride | | | |
|---|---|---|---|---|
| 18. Citraconic anhydride + aminopropyl terminated polydimethylsiloxane (MW = 850~900 g/mole) + n-butylamine in MeOH | below −30 | 40.14 | 7.83 | 2.56 |
| 19. Citraconic anhydride + Jeffamine ® (MW = 230 g/mole) + n-butylamine in MeOH | 38 | 59.50 | 7.68 | 7.15 |
| 20. Citraconic anhydride + 1,12 diaminododecane + n-butylamine in MeOH | 58 | 68.40 | 9.16 | 8.10 |
| 21. Itaconic anhydride + 1,10diamino decane + n-butylamine in MeOH | 48 | 65.90 | 8.64 | 9.02 |
| 22. Itaconic anhydride + ethylene diamine + n-butylamine in MeOH | 94 | 56.36 | 7.10 | 13.53 |

Please note that the ratio of the homopolymer of Formula AP-2/the homopolymer of Formula AP-1 for Comparative Example 2 is much lower than others, suggesting the homopolymer of Formula AP-1 is dominant in this product. However, this product is made from aliphatic anhydride and aromatic diaminodiphenyl sulfone. Thus, the product is not a truly aliphatic polyimide as the others are.

A comparison of the theoretical CHN contents of proposed structures with the CHN contents from experimental data was done to identify which proposed structure is more realistic, similar to the calculation that was done above. It is found the homopolymer of Formula AP-2 without monoamine in the repeat unit matches the CHN elemental analysis results better. In example 18, the Si content is analyzed by elemental analysis as well. The Si content was determined to be 27.75%, while the theoretical Si content for the homopolymer of Formula AP-2 is in the range of 26.62-27.90%. IR showed amide presence in some examples. The amide/imide ratio was calculated based CHN elemental analysis data. An estimation suggested that amide content was less than 30% of the compositions.

The glass transition temperature showed a decrease trend with increase of C number in the diamine used. When a shorter diamine chain is used, it implies less flexibility and therefore a high Tg transition is expected. The odd-even effect is observed as the glass transition of odd-numbered C atom diamine (e.g. $C_9$ diamine based material) is lower than even-numbered C atom diamine (e.g. $C_{10}$ diamine based material).

Example 23: Second Method, First Embodiment

Below is the Reaction Scheme for Example 23.

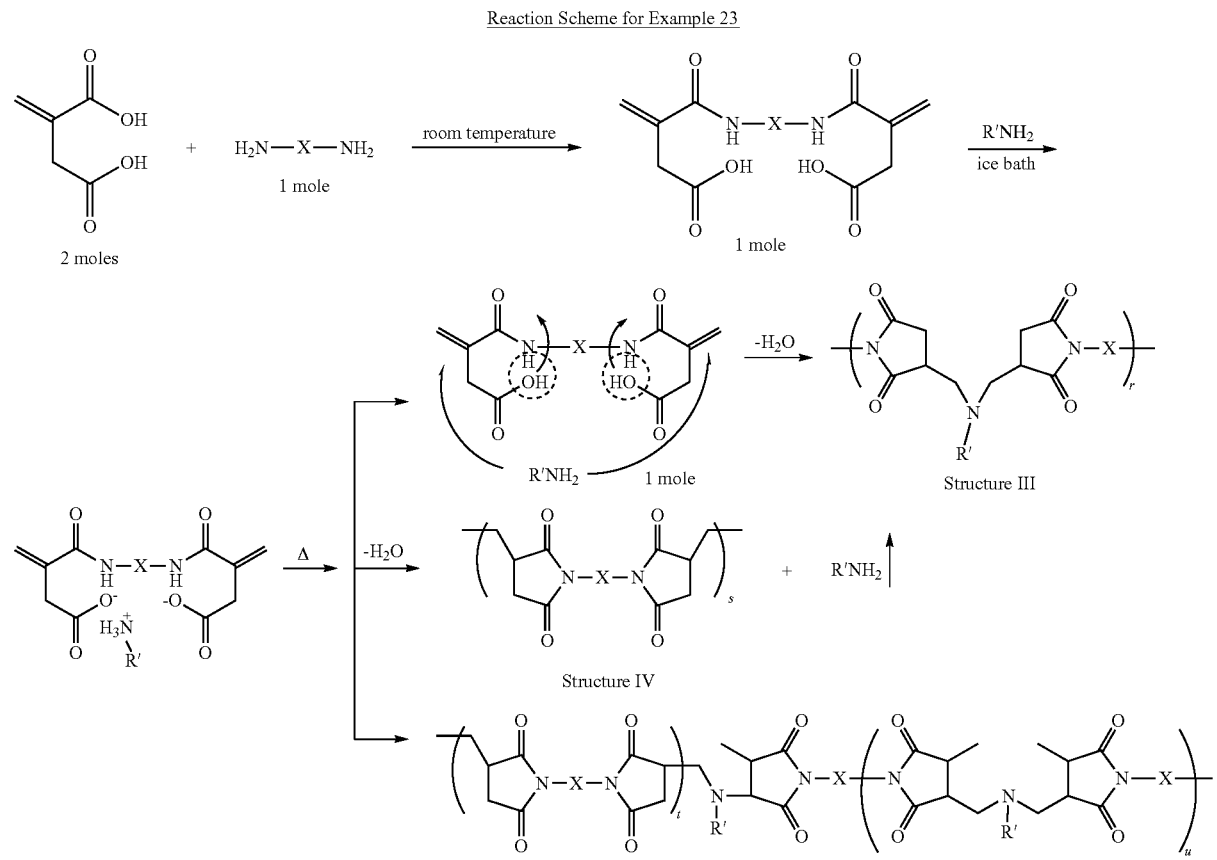

Reaction Scheme for Example 23

R' = (CH$_2$)$_3$CH$_3$, (CH$_2$)$_{13}$CH$_3$
X = (CH$_2$)$_{12}$, (CH$_2$)$_{10}$, (CH$_2$)$_9$, (CH$_2$)$_6$, (CH$_2$)$_4$, (CH$_2$)$_2$,

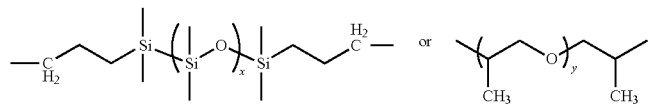

wherein r is greater than about 20 and preferably greater than about 150, wherein s is greater than about 20 and preferably greater than about 150, wherein t+u are greater than about 20 and preferably greater than about 150, wherein x can be 1 to 1000, desirably about 5 to about 25, and preferably about 8 to about 14, and wherein y can be 1 to 100, desirably about 2 to about 35, and preferably about 2 to about 8. It is contemplated that R' can be (CH$_2$)$_3$CH$_3$ to (CH$_2$)$_{21}$CH$_3$, inclusive, even though only (CH$_2$)$_3$CH$_3$ and (CH$_2$)$_{13}$CH$_3$ were tested.

Example 23 Mixture of poly-3-N-butylamino-methylene-3'-methylene-((1,1'-decane-1,10-diyl)-bis-(pyrrolidine-2,5-dione)), poly-3,3'-methylene-((1,1'-decane-1,10-diyl)-bis-(pyrrolidine-2,5-dione)), and poly-[3-N-butylamino-methylene-3'-methylene-((1, 1'-decane-1,10-diyl)-bis-(pyrrolidine-2,5-dione))]-co-[3,3'-methylene-((1,1'-decane-1,10-diyl)-bis-(pyrrolidine-2,5-dione))]

An amic-acid intermediate was prepared as follows. First, 1.3013 g of commercially available itaconic acid (0.01 mole) was dissolved in 10 g methanol in a single-neck flask along with a magnetic stirring bar. Then, 0.8619 grams of commercially available 1,10-diaminodecane (0.005 mole) was dissolved in 20 grams of methanol and then added dropwise into the solution over a one hour period. The flask was kept stirring continuously for another two hours. A white precipitate appeared in 5 minutes. The reaction was noticed to be exothermic. The intermediate was kept in solution and used for the next step. The intermediate prepared above was used to react with a monoamine as follows. 0.3656 g of commercially available n-butylamine (0.005 mole) was dissolved in 5 g of methanol and added slowly into the intermediate solution (containing 2.1632 grams intermediate) with stirring. The addition of n-butylamine required about two hours. The intermediate obtained via the reaction with n-butylamine was used to prepare polyimide film via thermal imidization. First, methanol in the solution was removed by evaporation at room temperature. Then, the viscous light yellow liquid was kept at 60° C. under vacuum for 2 hours, and then heated to 220° C. at a rate of 3° C./min. The final material is an amber-colored viscous liquid, which could be easily dissolved in THF and methanol. The structure was confirmed to have imide and amide functionality via FT-IR spectrum. The viscous liquid was subjected to GPC analysis for molecular weight information. GPC results gave a numbered average molecular weight of 865, and the weighted average molecular weight was Mw=1125. The film was sent for CHN elemental analysis to determine structure. However, the results of CHN elemental analysis showed a higher oxygen content, which suggested oxidation during reaction. FT-IR spectrum showed mainly imide functionality at 1671 cm$^{-1}$ and minor amide functionality at 1557 cm$^{-1}$. The glass transition temperature was 11° C.

Example 24: Second Method, Second Embodiment

Below is the reaction scheme for Example 24.

Reaction Scheme for Example 24

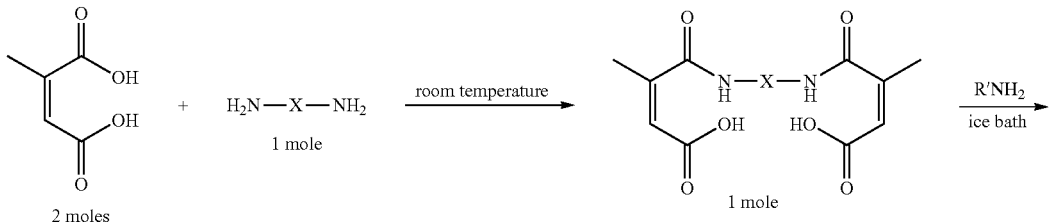

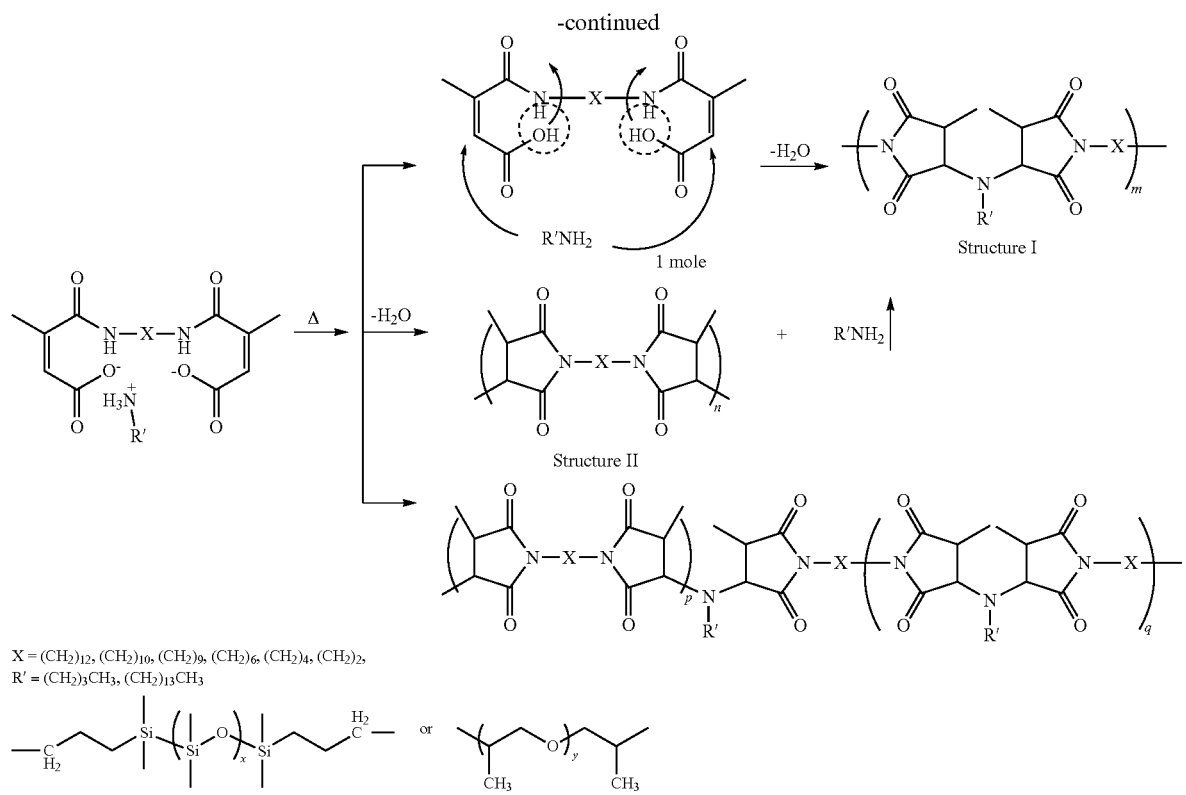

wherein m is greater than about 20 and preferably greater than about 150, wherein n is greater than about 20 and preferably greater than about 150, wherein p+q are greater than about 20 and preferably greater than about 150, wherein x can be 1 to 1000, desirably about 5 to about 25, and preferably about 8 to about 14, and wherein y can be 1 to 100, desirably about 2 to about 35, and preferably about 2 to about 8. It is contemplated that R' can be $(CH_2)_3CH_3$ to $(CH_2)_{21}CH_3$, inclusive, even though only $(CH_2)_3CH_3$ and $(CH_2)_{13}CH_3$ were tested.

Example 24: Mixture of poly-4-N-butylamino-yl-4'-yl-((1,1'-decane-1,10-diyl)-bis-(3-methyl-pyrrolidine-2,5-dione)), poly-4,4'-yl-((1,1'-decane-1,10-diyl)-bis-(3-methyl-pyrrolidine-2,5-dione)) and poly-[4-N-butylamino-yl-4'-yl-((1,1'-decane-1,10-diyl)-bis-(3-methyl-pyrrolidine-2,5-dione))]-co-[4,4'-yl-((1,1'-decane-1,10-diyl)-bis-(3-methyl-pyrrolidine-2,5-dione))]

An amic-acid intermediate was prepared as follows. First, 1.3014 g of commercially available citraconic acid (0.001 mole), an isomer of itaconic acid, was dissolved in 10 g methanol in a single-neck flask along with a magnetic stirring bar. Then, 0.8617 grams of commercially available 1,10-diaminodecane (0.005 mole) was dissolved in 20 grams of methanol and then added dropwise into the solution over a one hour period. The flask was kept stirring continuously for another two hours. The reaction was noticed to be exothermic. The solution was clear. The intermediate was kept in solution and used for the next step. The intermediate prepared above was used to react with a monoamine as follows. 0.3656 g of commercially available n-butylamine (0.005 mole) was dissolved in 5 g of methanol and added slowly into the intermediate solution (containing 2.1631 grams intermediate) with stirring. The addition of n-butylamine required about two hours. The intermediate obtained via the reaction with n-butylamine was used to prepare polyimide film via thermal imidization. First, methanol in the solution was removed by evaporation at room temperature. Then, the viscous light yellow liquid was kept at 60° C. under vacuum for 2 hours, and heated to 220° C. at a rate of 3° C./min. The final material is an amber-colored flexible film. The structure was confirmed to have mainly imide functionality (peak at 1699 cm$^{-1}$) via FT-IR spectrum along with minor amide (peak at 1535 cm-1) and isoimide imide (peak at 1775 cm$^{-1}$) functionalities. The material was sent for CHN elemental analysis to determine structure. The results of CHN elemental analysis matched the predicated imide structure. DSC gave a Tg transition of 113° C.

Summary of Second Method

Examples 23 and 24 were used to demonstrate that polyimide films could also be synthesized from reaction between unsaturated diacids and diamines. It was found that the existence of monoamine, e.g. n-butylamine, did not affect much the final structure. The first embodiment of the second method, Example 23, results in the same monomeric structures III and IV as the second embodiment of the first method (Examples 21-22). In this embodiment, the final polymers would be a mixture of (a homopolymer with monomeric structure III, a homopolymer with monomeric structure IV, and a random copolymer with both monomeric structure III and structure IV). The glass transition temperature of examples using this second method and the theoretical CHN contents of two different types of monomeric structures (structure III and structure IV) are listed in Table 2. The theoretical CHN contents were calculated based on the structures listed below. Monomeric structure III is obtained in the case that the monoamine is incorporated into the structure and forms the bridge between two imide moieties. Monomeric structure IV is obtained in the case that the monoamine participates in the reaction but is not incorporated into the final structure. In order to find out which monomeric structure is more close to the real structure, the difference between theoretical CHN contents (both from proposed monomeric structure III and proposed monomeric structure IV, as shown above for Examples 6-20 and Examples 21-22, respectively), and the actual CHN contents found from CHN elemental analysis is evaluated. The total difference value between theoretical CHN contents (monomeric structure III and monomeric structure IV, respectively) and from the actual CHN contents are also calculated to show which structure is more close to the real structure. The difference between theoretical values from monomeric structure III and actual values is higher than the difference between theoretical values from monomeric structure IV and actual values, suggesting that in most case, monomeric structure IV is more realistic. These results indicate that monoamine participates and promotes the reaction but leaves the system somehow, and it is not much of a part of the final proportions of possible Formulae AP-4, AP-5, and AP-6.

TABLE 2

Tg and CHN contents of examples using First Method for Diacid

| Example No., Composition & Solvent | Tg (° C.) | CHN Analysis | | |
|---|---|---|---|---|
| | | C % | H % | N % |
| 23. Itaconic acid + 1,10 diaminodecane + n-butyl-amine in MeOH | Imide, viscous liquid at RT, Mn ~865, Mw ~1125 Tg ~11 C. | 62.18 | 8.99 | 8.68 |
| 24. Citraconic acid + 1,10 diaminodecane + n-butyl-amine in MeOH | 113 | 66.93 | 8.38 | 8.46 |

The CHN data of Example 23 was compared with the theoretical CHN contents for the proposed monomeric structures. It was found that both monomeric structures do not well match the experimental CHN data. The oxygen content is higher than those of proposed structures. It is very likely due to the oxidation during reaction, caused by the reaction of C=C in the presence of oxygen.

The CHN data of Example 24 was compared with the theoretical CHN contents for the proposed monomeric structures. It was found that the monomeric structure without monoamine in the repeat unit matched the experimental data better, suggesting this monomeric structure is more realistic.

Analysis of Methods of Synthesis

Effect of Monomers, Solvents, Process Methods, Stabilizers and Catalysts on the Thermal Properties of Aliphatic Polyimides Number of C Atoms in Diamine.

Number of C Atoms in Diamine

For both methods of this invention, the glass transition temperature (Tg) of the aliphatic polyimides fell in a range of a little above room temperature up to 185° C. when diamines with different C atoms were used. A shorter diamine chain was used, implying less flexibility and therefore a high Tg was obtained. When a diamine with long chain length is used, e.g. Jeffamine®, or polysiloxane, Tg could be even lower than −30° C.

Odd-Even Effect

The odd-even effect is observed from the chart above, meaning that Tg of a sample using an odd-numbered diamine is usually lower than a sample using an even-numbered diamine.

Types of Anhydrides

Selection of the anhydride could affect the glass transition in the same way for these three preparation methods. Based on the observations, itaconic anhydride tends to give a lower Tg compared to citraconic anhydride.

Anhydride vs. Diacid

Citraconic acid and citraconic anhydride performed closely. It appeared that citraconic acid gave a slightly higher Tg than the anhydride. However, citraconic acid is a solid and citraconic anhydride is a liquid, meaning citraconic acid would be preferred due to easy handling. Itaconic acid could not form high MW polyimide. It is probably due to the oxidation of C=C bonds during reaction.

Type of Solvents

Several solvents were used to prepare aliphatic polyimides, e.g. methanol, isopropanol, and THF. Based on the comparative experiments, when the same monomers and conditions are used, methanol always gives a higher Tg than isopropanol or THF. Isopropanol and THF performed closely in terms of change of Tg. An interesting observation is found that THF does not show a good repeatability. In some duplicate experiments, THF could not give a high MW aliphatic polyimide probably due to the existing inhibitor during manufacturing.

Solution Process Vs. Melt Process

For both methods of this invention, a solution process has two steps: formation of polyamic acid in solution and thermal imidization. Solution process is good for better mixing and dissipation of heat for the first step. Thermal imidization happens later as a separated step. For both methods, melt processing on a hot plate was considered. But because a volatile monoamine is used, a hot plate reaction is not suitable.

Effect of Stabilizers

Stabilizers could effectively reduce the color of the aliphatic polyimides, and also lower the amide content. Three types of stabilizers were used in this document, Irganox® MD 1024, Irgafox® P-EPQ, and Irganox® 1010. By comparison of aliphatic polyimide films prepared with and without stabilizers, use of stabilizers gave lower Tg, which possible comes from the incomplete reaction on hot plate. The structures of these stabilizers are listed as below.

Vacuum Vs. Stabilizers

Use of vacuum during cooling after imidization could effectively reduce the color of aliphatic polyimides and lower the amide content in the structure. The color of aliphatic polyimide film made by using vacuum during cooling is a very light yellow color, which probably is the intrinsic color of aliphatic polyimide itself. Any oxidization and formation of iosimide during the preparation could make the final color darker. The Tg of aliphatic polyimide film made by using vacuum during cooling is higher than those made using stabilizers for all three stabilizers used. It is possibly due to the long cooling time (~1.5 hours) under heat.

Effect of Catalyst

It has been demonstrated that the melt reaction could be promoted by using selected imidization catalysts, such as sodium phenyl phosphinate. In this document, the reaction time has been reduced from 4 minutes at 220° C. to about 2 minutes using about 2% loadings. It is felt that these conditions can be optimized greatly. This kinetics study has shown the reaction occurs in less than two minutes. The color goes from yellow to amber Effect of Monoamine In both methods, it has been shown that monoamine, e.g. n-butyl amine, did participate the reaction but somehow it mostly left the system during the reaction, which is confirmed by GC-MS of intermediates and elemental analysis of final products. Therefore, this monoamine more likely performed as a catalyst by promoting the reaction and leaving eventually. The use of monoamine brought a high Tg to the product in most cases.

Comparison of Methodology

Both methods of this invention gave a high Tg. However, both methods did require the use of a volatile monoamine, which might limit processing methods to minimize loss of monoamine during reaction.

Hydrolytic Stability.

The hydrolytic stability of aliphatic polyimide was measured by changes in conductivity in de-ionized water. A less hydrolytic stable material was expected to hydrolyze faster and show a high conductivity. It has been found that the hydrolytic polyimide of aliphatic polyimide in boiling water and also at 80° C. for long term is much better hydrolytic stability than polylactic acid (PLA, NatureWorks Ingeo™ Biopolymer 4042D) and is comparable to that of polyethylene terephthalate (PET, a piece of water bottle), Nylon 6 (Ultramid® B27E, BASF) showed conductivity close to PET, Nylon 12 (UBE Nylon Resin 3030U, UBE Material Industries, Ltd), all of which were chosen for comparisons. The appearance of aliphatic polyimide was maintained with slight change in color and no change of shape after 7 months. An increase of glass transition temperature to 224° C. for aliphatic polyimide after hydrolytic test was observed from 182° C.

Thermal Aging

The thermal aging study of aliphatic polyimide was performed at a temperature close to the glass transition temperature of the aliphatic polyimide sample. The aliphatic polyimide sample made from citraconic anhydride/n-butylamine/ethylenediamine with a molar ratio of 2/1/1 was weighted and kept in an air-recirculating oven at 150° C. The glass transition of this aliphatic polyimide is 151° C. The weight loss was recorded. An initial weight loss was ~2 wt % in 24 hours. After then, no significant weight loss was seen in up to 5000 hours.

QUV Accelerated Weathering Test

Overall, no significant changes in structure were seen via FT-IR spectra except the appearance of moisture peaks. A darker color was observed for each sample after exposure to UVA light after 250 hours and no further changes thereafter. Minor changes in flexibility of the films were noticed based on visual observation.

Dielectric Constant

The dielectric constant of aliphatic polyimide fell in the range of 2.87-3.10 under frequency from 1000 Hz to 10 MHz. As a comparison, the dielectric constants of common used polymers range from a low of 2.2 for polypropylene to a high of 3.6 for Nylon 6 at a frequency of 1 MHz. Thus the aliphatic polyimide can also be used comparably to other polymers as an electric insulator.

Bio-Content

Bio-content test was done in Beta Analytic Inc in Miami, Fla. This gave the quantification of renewable carbon content by ASTM-D6866. ASTM-D6866 cites precision on The Mean Biobased Result as +/−3% (absolute). This is the most conservative estimate of error in the measurement of complex biobased containing solids and liquids based on empirical results. "Percent biobased" specifically relates % renewable (or fossil) carbon to total carbon, not to total mass or molecular weight. Mean biobased estimates greater than 100% are assigned a value of 100% for simplification. It was found that the polyimide film in Example 1 has 98% of C atoms from bio-sources, and only 2% of carbon atoms from fossil carbons. The 2% fossil carbons are very likely the carbons from n-butylamine, which was used to promote the reaction. It is believed that the materials could be made into 100% bio-content if n-butylamine is avoided in the reaction or was bio-derived.

Flammability

Bio-derived polyimide film was subjected to an open flame test; the bio-derived polyimide film with a thickness of 0.42-0.47 mm did burn but charred up greatly and did not exhibit a flaming drip. PLA on the other hand withdrew from the flame but burned with almost no flame. PET film with a thickness of 0.14 mm exhibited burning and yielded flaming drips upon burning. The ethylene diamine based aliphatic polyimide charred a lot during burning test (with a thickness of 0.47 mm), and it had left 16% char at 700° C. in nitrogen. The diaminobutane based aliphatic polyimide also charred greatly during burning test (with a thickness of 0.42 mm).

Glass Transition Temperatures

The glass transition temperatures of the polyimides of the invention by this method can range from about −100° C. to about 225° C. and what was observed was from less than about −30° C. (equipment limitation) to about 185° C. However the sample after hydrolytic aging showed an increase to 225° C. presumably due to further reaction; this Tg can be achievable upon initial preparation with process optimization.

Uses of Aliphatic Polyimides

Compounds and Uses of Compounds

Any of the aliphatic polyimides described above can be melt-mixed with one or more conventional plastics additives in an amount that is sufficient to obtain a desired processing or performance property for the aliphatic polyimide compound. The amount should not be wasteful of the additive or detrimental to the processing or performance of the compound. Those skilled in the art of thermoplastics compounding, without undue experimentation but with reference to such treatises as *Plastics Additives Database* (2004) from Plastics Design Library (elsevier.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers, fibers, and extenders; flame retardants; smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; catalyst deactivators, and combinations of them.

The compound can comprise, consist essentially of, or consist of any one or more of the aliphatic polyimides in combination with any one or more the functional additives. Any number between the ends of the ranges is also contemplated as an end of a range, such that all possible combinations are contemplated within the possibilities of Table 3 as candidate compounds for use in this invention.

TABLE 3

| Ingredient | Acceptable | Desirable | Preferable |
| --- | --- | --- | --- |
| Aliphatic Polyimide(s) | 30-99.999 | 70-99 | 80-95 |
| Functional Additive(s) | 0.001-70 | 1-30 | 5-20 |

Processing

The preparation of compounds of the present invention is uncomplicated. The compound of the present can be made in batch or continuous operations.

Mixing in a continuous process typically occurs in a single or twin screw extruder that is elevated to a temperature that is sufficient to melt the polymer matrix with addition of other ingredients either at the head of the extruder or downstream in the extruder. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is capable of operating at a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com), one can make articles of any conceivable shape and appearance using compounds of the present invention.

Compounds of the present invention can be made into any extruded, molded, calendered, thermoformed, or 3D-printed article. Candidate end uses for such thermoplastic articles are listed in summary fashion below.

Appliances: Refrigerators, freezers, washers, dryers, toasters, blenders, vacuum cleaners, coffee makers, and mixers;

Building and Construction: Fences, decks and rails, floors, floor covering, pipes and fittings, siding, trim, windows, doors, molding, and wall coverings;

Consumer Goods: Power hand tools, rakes, shovels, lawn mowers, shoes, boots, golf clubs, fishing poles, and watercraft;

Electrical/Electronic Devices: Printers, computers, business equipment, LCD projectors, mobile phones, connectors, chip trays, circuit breakers, and plugs;

Healthcare: Wheelchairs, beds, testing equipment, analyzers, labware, ostomy, IV sets, wound care, drug delivery, inhalers, and packaging;

Industrial Products: Containers, bottles, drums, material handling, gears, bearings, gaskets and seals, valves, wind turbines, and safety equipment;

Consumer Packaging: Food and beverage, cosmetic, detergents and cleaners, personal care, pharmaceutical and wellness containers;

Transportation: Automotive aftermarket parts, bumpers, window seals, instrument panels, consoles, under hood electrical, and engine covers; and Wire and Cable: Cars and trucks, airplanes, aerospace, construction, military, telecommunication, utility power, alternative energy, and electronics.

APPENDIX

To further explain the value of the present invention, the following text helps support the identification and definition of "bio-derived monomers" for the synthesis of aliphatic polyimides, as this area of chemistry of bio-based sources or renewable resources develops monomers and other chemicals from biologically active sources.

Synthesis Methods for Starting Materials from Natural Sources

1. Citric Acid

Bio-Synthesis of Citric Acid and Purification

Citric acid is a commercially important product that has been obtained by submerged fermentation of glucose or sucrose by *Aspergillus niger*. In order for citric acid to be a useful starting material for the production of bio-derived polymers, it should be readily produced from impure starting materials such as starch hydrolyzates, invert sugars, aqueous vegetable extracts containing sugar and partially refaine sucrose sources. It has been found that traces of iron in levels as low as 0.2 ppm is sufficient to promote the generation of large amounts of non-acid-producing cells of the *Aspergillus niger*, with the result that little or no citric acid is produced. However, as referenced in U.S. Pat. No. 2,970,084 (1961) by Leornard Schweiger discovered that low levels of ionic copper counteracts the effect of iron impurities in the starting sugar source. Following the teachings of this patent, high yields of citric acid can be obtained by the following procedure:

An aqueous medium was prepared having the following composition where in raw (not deionized) corn sugar was used as the carbohydrate source and dissolved in 4000 ml distilled water. To this was added the following nutrients:

$(NH)_2CO_3$, 0.2%; $KH_2PO_4$, 0.014%; $MgSO_4.7H_2O$, 0.100%; $ZnSO_4$, 0.001%; Corn sugar (as dextrose), 12.3%; $Cu(NO_3)_2.3H_2O$, 0.015%. The pH was adjusted to 2.55 with aqueous HCl, and the substrate sterilized in an autoclave at 125 C for 30 minutes, cooled, and transferred aspectically to about 6000 ml Pyrex® glass column fermentors, then inoculated with spores of *Aspergillus niger*. Fermentations were allowed to proceed at room temperature under aseptic conditions for 12 days.

The resulting broth contains about 20% citric acid and is generally purified following the teachings of Purification was done following the "lime/sulfuric acid process" as described in U.S. Pat. No. 5,426,220 (1995), A. Baniel, A. Eval. Generally the content of citric acid resulting from the above recipe is about 20% citric acid, and this mixture is filtered to remove mycellium and then treated with 680 gram of $Ca(OH)_2$ to precipitate calcium citrate. The latter is filtered, washed and reacted with 920 gram of 98% sulfuric acid to form gypsum and a solution of citric acid. The citric acid solution obtained on gypsum filtration is fed to a crystallizer or alternatively evaporated and stripped of mother liquor via vacuum filtration to yield 1050 gram of crystalline citric acid monohydrate and approximately 320 gram of 60% citric acid mother liquor which can be combined and recrystallized.

Synthesis of Citraconic Anhydride Via Intermediate Itaconic Acid (Ref.: Organic Syntheses, Coll. Vol. 2, p. 368 (1943); Vol. 11, p. 70 (1931), Note 8.

2. Itaconic Anhydride

Itaconic Anhydride from Citric Acid Monohydrate

Nine 120-g. portions of citric acid are distilled rapidly (four to six minutes), using 300-cc. Kjeldahl flasks, and all the distillates are collected in the same receiver. The distillate, which generally does not consist of two layers, is placed in an evaporating dish, 50 cc. of water is added, and the mixture is allowed to stand on a steam bath for three hours. On cooling it sets to a semi-solid mass of itaconic acid: this is filtered and washed with 150 cc. of water. The residue consists of 138 g. of perfectly white crystals melting at 1650. By concentrating the filtrate an additional 42 g. of product melting at 157-165° is obtained. The total yield is 26-27 percent of the theoretical amount, and is a convenient laboratory method since it is rapid.

3. Citraconic Anhydride

*Citraconic Anhydride from Itaconic Anhydride* (Ref.: *Organic Syntheses*, Coll. Vol. 2, p. 140 (1943); Vol. 11, p. 28 (1931).

Two hundred and ninety grams (equivalent to 250 grams itaconic anhydride, either can be used) is distilled rapidly at atmospheric pressure in a 500-cc. modified Claisen flask with a 15-cm. (6-in.) fractionating column; it should be noted that the success of the preparation depends upon a rapid distillation and changing the receivers without interrupting the distillation. The best yields are obtained when the heating period is of short duration. The distillate passing over below 200° consists of water and other decomposition products. The fraction which distils at 200-215° consists of citraconic anhydride and is collected separately. The yield is 170-180 g. (68-72 percent of the theoretical amount) of a product melting at 5.5-6°. On redistillation under reduced pressure there is obtained 155-165 g. (62-66 percent of the theoretical amount) of a product which boils at 105-110°/22 mm. and melts at 7-8° C.

4. 1,10-Diaminodecane

Bio-Synthesis and Purification of 1,10-Diamino Decane

Sebacic acid can be obtained from castor oil. Sebaconitrile can be obtained by ammonolysis of sebacic acid. Diaminodecane can be obtained by the addition of H2 to sebaconitrile with the presence of catalyst.

Step One: Castor Oil to Sebacic Acid

Sebacic acid can be obtained from castor oil by alkali fusion. The alkali fusion of castor oil at 523-548 K in the presence of excess alkali and catalyst produces sebacic acid, 2-octanol (capryl alcohol), and hydrogen. The oleochemicals (sebacic acid and 2-octanol) are precursors for industrially important plasticizers, surface coatings, and perfumery chemicals. 2-Octanol is used in plasticizers in the form of dicapryl esters of various dibasic acids.

Reaction was carried out at a temperature of 458-463 K for a long period (such as 13 h) using 1 mol of sodium or potassium hydroxide. 2-Octanone (methyl hexyl ketone) and 10-hydroxydecanoic acid were obtained as a reaction product. Using 2 mol of alkali per 1 mol of ricinoleate at 513-549 K and with a shorter reaction cycle produces 2-octanol and sebacic acid. Hydrogen was also formed with excess alkali.

The reaction flow chart is found in *Ind. Eng. Chem. Res.* 2008, 47, 1774-1778

Step Two: Sebacic Acid to Sebaconitrile

A three-necked flask, equipped with a mechanical stirrer and a thermometer which dips into the liquid, is heated in an oil bath to 1600. In the flask are placed 505 g. (2.5 moles) of commercial sebacic acid and 180 g. (3 moles) of urea, and the melt is heated with stirring for 4 hours at about 160°. The oil bath is removed, the surplus oil is wiped off, the flask is insulated, and the temperature is then raised, as rapidly as foaming permits, to 220° by means of a triple burner and wire gauze. It is important to continue the stirring for at least 5 minutes after 220° is attained; otherwise the mass will foam over during the subsequent distillation.

The stirrer is then replaced by a short still head connected to a long (90-cm.) air condenser and receiver, and the product is distilled at atmospheric pressure as long as water distillate is obtained. The temperature of the vapor rises gradually to 3400. The distillate, which consists chiefly of water, dinitrile, acid nitrile, and sebacic acid, is poured into a large separatory funnel and, after the addition of 500 ml. of ether, is extracted three times with 650-ml. portions of 5% ammonium carbonate. The crude dinitrile which remains after the removal of the ether is distilled under reduced pressure; after a small fore-run (20-25 ml.) the main product is collected at 185-188°/12 mm. The yield of sebaconitrile is 190-200 g. (46-49%).

The reaction scheme is found in *Organic Syntheses*, Coll. Vol. 3, p. 768 (1955); Vol. 25, p. 95 (1945).

Step Three: Sebaconitrile to 1,10-Decanediamine

A high-pressure bomb of about 1.1-1. capacity is charged with 82 g. (0.50 mole) of sebaconitrile and about 6 g. of Raney nickel catalyst suspended in 25 ml. of 95% ethanol, an additional 25 ml. of ethanol being used to rinse in the catalyst. The bomb is closed, and about 68 g. (4 moles) of liquid ammonia is introduced from a tared 5-lb. commercial cylinder. Hydrogen is then admitted at tank pressure (1500 lb.), and the temperature is raised to 1250. The reaction starts at about 90° and proceeds rapidly at 110-125°. When hydrogen is no longer absorbed (1-2 hours) the heater is shut off and the bomb allowed to cool. The hydrogen and ammonia are allowed to escape, and the contents of the bomb are rinsed out with two 100-ml. portions of 95% ethanol. The ethanolic solution is filtered quickly through a layer of decolorizing carbon to remove the catalyst and transferred to a 500-ml. Claisen flask having a modified side arm and connected by ground-glass joints to a receiver. The ethanol is removed by distillation at atmospheric pressure, the receiver is changed, and the decamethylene-diamine is distilled under reduced pressure. It boils at 143-146°/14 mm and solidifies, on cooling, to a white solid, freezing point 60°. The yield is 68-69 g. (79-80%).

The reaction scheme is identified in *Organic Syntheses*, Coll. Vol. 3, p. 229 (1955); Vol. 27, p. 18 (1947).

5. Tetradecylamine

Bio-Synthesis and Purification of Tetradecylamine

Myristic acid can be obtained from coconut oil via hydrolysis and fractionation. Tetradecylamine can be obtained by reaction of myristic acid with ammonia to get its nitrile, and then followed by hydration to give tetradecylamine.

Step One: Coconut Oil to Trimyristin

In the container A is placed 1500 g. of crushed nutmegs moistened with ether. A is an inverted aspirator bottle connected by a 3-mm. glass tube to the efficient condenser C, and by 3-mm. tubing, one end of which is provided with a Soxhlet thimble to the round-bottomed flask B. Flask B is connected by 3-mm. tubing of 75-cm. length to C. In B are placed 500 cc. of ether and a few chips of clay plate to prevent superheating. B is then heated on a steam cone so that the ether boils rapidly enough to reach the condenser C and to flow back through A.

The extraction with ether is continued until the ether leaving the insoluble solid is entirely colorless. This requires twenty-four to seventy-two hours, according to the state of subdivision of the nutmegs and the rate at which the ether is passed through. The ethereal solution is then freed of a small quantity of entrained insoluble matter by filtering through a folded paper. The clear solution is now entirely freed from ether by distillation on the water bath. The residue weighs 640-690 g. On cooling it sets to a mass of crystals of trimyristin which is filtered with suction and washed with 225 cc. of cold 95 percent ethyl alcohol in small portions. The product is now recrystallized from 3.5 l. of 95 percent ethyl alcohol; it is stirred mechanically during cooling since the trimyristin tends to separate as an oil at the outset. The crystallized trimyristin is then filtered off by suction and washed with 350-400 cc. of 95 percent alcohol in small portions. The crystals, which are colorless and practically odorless, melt at 54-550. The yield is 330-364 g. Further information is found in *Organic Syntheses*, Coll. Vol. 1, p. 538 (1941); Vol. 6, p. 100 (1926).

Step Two: Trimyristin to Myristic Acid

In a round-bottomed flask are placed 100 g. (0.14 mole) of pure trimyristin www.orgsyn.org/orgsyn/orgsyn/prepContent.asp?prep=cvp0379-Note169N1 www.orgsyn.org/orgsyn/prep.asp?prep=CV1P0538 and 200 cc. of 10 percent sodium hydroxide solution. The mixture is heated on a steam bath for two hours, with frequent shaking or stirring until the trimyristin has become emulsified. It is then diluted with 300 cc. of water and the heating is continued for another one-half hour, by which time the solution should be almost clear, indicating complete saponification. The solution is now poured with stirring into a hot solution of 650 cc. of water and 100 cc. of 20 percent hydrochloric acid. The free acid which separates is not entirely clear, owing to the presence of unchanged sodium salt. A gentle current of steam is passed into the hot mixture until the oily layer is transparent; this requires about fifteen minutes. The acid is allowed to cool and solidify; it is removed and freed of small quantities of salt and water by filtering through paper in a steam-jacketed funnel. The yield is 84-90 g. (89-95 percent of the theoretical amount) of a colorless product which melts at 52-53° www.orgsyn.org/orgsyn/orgsyn/prepContent.asp?prep=cvlp0379-Note169N3.

Further information is found in *Organic Syntheses*, Coll. Vol. 1, p. 379 (1941); Vol. 6, p. 66 (1926).

Step Three: Myristic Acid to Tetradecylamine

Commercially, the synthesis of these quaternary ammonium salts involves the reaction of fatty acids with ammonia, in a combined liquid-phase-vapor-phase process, to form the corresponding fatty nitriles (I). These long-chain alkylnitriles (LANs) are converted by hydrogenation to primary or secondary amines, depending on the reaction conditions. Reductive alkylation of these amines with formaldehyde affords the trialkylamines (TAMS) (II), which are quaternized by exhaustive alkylation with methyl chloride to the final di- or trimethylalkylammonium salts (III).

Extensive purification of these products is not required to achieve the activity of the final product, so that most commercial cationic surfactants are associated with a mixture of their starting materials and reaction intermediates. In this respect, we found in dimethylditallowammonium chloride (DMDTAC), the most common cationic surfactant used in laundry detergents, concentrations of 300-320 µg/g of $C_{14}$-$C_{18}$ LANs (I) and of 450-500 g/g of TAMS (II).

Further information can be found in "Occurrence of Cationic Surfactants and Related Products in Urban Coastal Environments", P. Fernandez, M. Valls, J. M. Bayona, and J. Albalges *Environ. Sci. Technol.* 1991, 25, 547-550

6. Comments about Bio-Sourced Maleic Anhydride, n-Butylamine

Although all monomers utilized presently cannot be determined to be all bio-derived, they indeed can be obtained from renewable sources as indicated in the Experimental section. n-butylamine is not yet commercially available from bio-derived sources, but n-butanol is and can be transformed to n-butylamine quite readily. Similarly, maleic anhydride itself is not available commercially from bio-derived sources at present but its potential precursors, namely 1,4 butanediol and succinic acid are commercially available from bio-derived sources via fermentation. Meanwhile tetradecylamine can be derived primarily from coconut oil, and is known commercially as cocoamine, or from myristicin which is isolated from nutmeg oil obtained from the nutmeg tree, genus *Myristica*. 1,10 diaminodecane is commercially available for use in making bio-nylons being obtained from castor bean oil, extracted from the castor oil plant, *Ricinus communis*.

Similarly, citraconic anhydride can be obtained from itaconic anhydride or acid which is made by heat treating citric acid. Citric acid is commercially obtained by the fermentation of sugars, e.g. fructose, beet syrup, etc. Thus the described reaction sequences above describe the novel preparation of a bio-derived aliphatic polyimide of high molecular weight from bio-derived monomers.

The invention is not limited to the above embodiments. The claims follow.

What is claimed is:

1. An aliphatic polyimide, wherein the aliphatic polyimide is selected from the group consisting of:
(a) a mixture of poly-3-N-butylamino-methylene-3'-methylene-((1,1'-decane-1,10-diyl)-bis-(pyrrolidine-2,5-dione)), poly-3,3'-methylene-((1,1'-decane-1,10-diyl)-bis-(pyrrolidine-2,5-dione)), and poly-[3-N-butylamino-methylene-3'-methylene-((1,1'-decane-1,10-diyl)-bis-(pyrrolidine-2,5-dione))]-co-[3,3'-methylene-((1,1'-decane-1,10-diyl)-bis-(pyrrolidine-2,5-dione))];
(b) a mixture of poly-3-N-butylamino-methylene-3'-methylene-((1,1'-ethane-1,2-diyl)-bis-(pyrrolidine-2,5-dione)), poly-3,3'-methylene-((1,1'-ethane-1,2-diyl)-bis-(pyrrolidine-2,5-dione)), and poly-[3-N-butylamino-methylene-3'-methylene-((1,1'-ethane-1,2-diyl)-bis-(pyrrolidine-2,5-dione))]-co-[3,3'-methylene-((1,1'-ethane-1,2-diyl)-bis-(pyrrolidine-2,5-dione))];
(c) a mixture of poly-4-N-butylamino-yl-4'-yl-((1,1'-butane-1,4-diyl)-bis-(3-methyl-pyrrolidine-2,5-dione)), poly-4,4'-yl-((1,1'-butane-1,4-diyl)-bis-(3-methyl-pyrrolidine-2,5-dione)) and poly-[4-N-butylamino-yl-4'-yl-((1,1'-butane-1,4-diyl)-bis-(3-methyl-pyrrolidine-2,5-dione))]-co-[4,4'-yl-((1,1'-butane-1,4-diyl)-bis-(3-methyl-pyrrolidine-2,5-dione))];
(d) a mixture of poly-4-N-butylamino-yl-4'-yl-((1,1'-decane-1,10-diyl)-bis-(3-methyl-pyrrolidine-2,5-dione)), poly-4,4'-yl-((1,1'-decane-1,10-diyl)-bis-(3-methyl-pyrrolidine-2,5-dione)) and poly-[4-N-butylamino-yl-4'-yl-((1,1'-decane-1,10-diyl)-bis-(3-methyl-pyrrolidine-2,5-dione))]-co-[4,4'-yl-((1,1'-decane-1,10-diyl)-bis-(3-methyl-pyrrolidine-2,5-dione))];
(e) a mixture of poly-4-N-butylamino-yl-4'-yl-((1,1'-dodecane-1,12-diyl)-bis-(3-methyl-pyrrolidine-2,5-dione)), poly-4,4'-yl-((1,1'-dodecane-1,12-diyl)-bis-(3-methyl-pyrrolidine-2,5-dione)) and poly-[4-N-butylamino-yl-4'-yl-((1,1'-dodecane-1,12-diyl)-bis-(3-methyl-pyrrolidine-2,5-dione))]-co-[4,4'-yl-((1,1'-dodecane-1,12-diyl)-bis-(3-methyl-pyrrolidine-2,5-dione))]; and
(f) a mixture of poly-4-N-butylamino-yl-4'-yl-((1,1'-ethane-1,2-diyl)-bis-(3-methyl-pyrrolidine-2,5-dione)), poly-4,4'-yl-((1,1'-ethane-1,2-diyl)-bis-(3-methyl-pyrrolidine-2,5-dione)) and poly-[4-N-butylamino-yl-4'-yl-((1,1'-ethane-1,2-diyl)-bis-(3-methyl-pyrrolidine-2,5-dione))]-co-[4,4'-yl-((1,1'-ethane-1,2-diyl)-bis-(3-methyl-pyrrolidine-2,5-dione))];
(g) a mixture of poly-4-N-butylamino-yl-4'-yl-((1,1'-hexane-1,6-diyl)-bis-(3-methyl-pyrrolidine-2,5-dione)), poly-4,4'-yl-((1,1'-hexane-1,6-diyl)-bis-(3-methyl-pyrrolidine-2,5-dione)) and poly-[4-N-butylamino-yl-4'-yl-(1,1'-hexane-1,6-diyl)-bis-(3- methyl-pyrrolidine-2,5-dione))]-co-[4,4'-yl-((1,1'-hexane-1,6-diyl)-bis-(3-methyl-pyrrolidine-2,5-dione))];

(h) all a mixture of poly-4-N-butylamino-yl-4'-yl-((1,1'-nonane-1,9-diyl)-bis-(3-methyl-pyrrolidine-2,5-dione)), poly-4,4'-yl-((1,1'-nonane-1,9-diyl)-bis-(3-methyl-pyrrolidine-2,5-dione)) and poly-[4-N-butylamino-yl-4'-yl-((1,1'-nonane-1,9-diyl)-bis-(3-methyl-pyrrolidine-2,5-dione))]-co-[4,4'-yl-((1,1'-nonane-1,9-diyl)-bis-(3-methyl-pyrrolidine-2,5-dione))];

(i) a mixture of poly-4-N-butylamino-yl-4'-yl-(1,1'-bis-trimethylene polydimethyl siloxane-bis-(3-methyl-pyrrolidine-2,5-dione)), poly-4,4'-yl-((1,1'-bis-trimethylene polydimethyl siloxane)-bis-(3-methyl-pyrrolidine-2,5-dione)) and poly-[4-N-butylamino-yl-4'-yl-(1,1'-bis-trimethylene polydimethyl siloxane-bis-(3-methyl-pyrrolidine-2,5-dione))]-co-[4,4'-yl-(1,1'-bis-trimethylene polydimethyl siloxane-bis-(3-methyl-pyrrolidine-2,5-dione))];

(j) a mixture of poly-4-N-butylamino-yl-4'-yl-(1,1'-polyoxypropylene-bis-(3-methyl-pyrrolidine-2,5-dione)), poly-4,4'-yl-((1,1'-polyoxypropylene)-bis-(3-methyl-pyrrolidine-2,5-dione)) and poly-[4-N-butylamino-yl-4'-yl-(1,1'-polyoxypropylene-bis-(3-methyl-pyrrolidine-2,5-dione))]-co-[4,4'-yl-(1,1'-polyoxypropylene-bis-(3-methyl-pyrrolidine-2,5-dione))];

(k) a mixture of poly-4-N-tetradecylamino-yl-4'-yl-((1,1'-decane-1,10-diyl)-bis-(3-methyl-pyrrolidine-2,5-dione)), poly-4,4'-yl-((1,1'-decane-1,10-diyl)-bis-(3-methyl-pyrrolidine-2,5-dione)) and poly-[4-N-tetradecylamino-yl-4'-yl-((1,1'-decane-1,10-diyl)-bis-(3-methyl-pyrrolidine-2,5-dione))]-co-[4,4'-yl-((1,1'-decane-1,10-diyl)-bis-(3-methyl-pyrrolidine-2,5-dione))]; and (l) combinations thereof.

2. A compound comprising the aliphatic polyimide of claim 1 and one or more functional additives.

3. The compound of claim 2, wherein the functional additive is selected from the group consisting of adhesion promoters; biocides; anti-fogging agents; anti-static agents; bonding, blowing and foaming agents; dispersants; fillers, fibers, and extenders; flame retardants; smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; catalyst deactivators, and combinations of them.

4. An article molded or extruded from the compound of claim 2.

* * * * *